US007243952B2

(12) United States Patent
Shimada et al.

(10) Patent No.: US 7,243,952 B2
(45) Date of Patent: Jul. 17, 2007

(54) AUTHENTICATABLE PRINTED MATTER, AND METHOD FOR PRODUCING THE SAME

(75) Inventors: Kazuhiko Shimada, Odawara (JP); Hisashi Okumura, Tokyo-To (JP); Masato Kiuchi, Kashiwa (JP)

(73) Assignee: National Printing Bureau, Incorporated Administrative Agency, Minato-ku, Tokyo (JP)

( * ) Notice: Subject to any disclaimer, the term of this patent is extended or adjusted under 35 U.S.C. 154(b) by 754 days.

(21) Appl. No.: 10/297,679

(22) PCT Filed: Jun. 8, 2001

(86) PCT No.: PCT/JP01/04846

§ 371 (c)(1), (2), (4) Date: Dec. 9, 2002

(87) PCT Pub. No.: WO01/94122

PCT Pub. Date: Dec. 13, 2001

(65) Prior Publication Data

US 2004/0021311 A1 Feb. 5, 2004

(30) Foreign Application Priority Data

Jun. 9, 2000 (JP) ............................ 2000-172866

(51) Int. Cl.
*B42D 15/00* (2006.01)
*G06K 9/00* (2006.01)

(52) U.S. Cl. ............................ 283/93; 283/7; 428/916

(58) Field of Classification Search .................. 283/93, 283/72, 902; 428/916, 915; 382/135; 380/54
See application file for complete search history.

(56) References Cited

U.S. PATENT DOCUMENTS 4,175,774 A * 11/1979 Tonges et al. ................ 283/94
5,005,873 A 4/1991 West
5,592,205 A * 1/1997 Shimizu et al. ............. 347/115
5,954,368 A * 9/1999 Mowry, Jr. .................. 283/93
6,138,913 A 10/2000 Cyr et al.
6,275,248 B1 * 8/2001 Nakamura et al. .......... 347/232
6,692,031 B2 * 2/2004 McGrew ...................... 283/93

FOREIGN PATENT DOCUMENTS

| | | | |
|---|---|---|---|
| EP | 0 279 526 | A2 | 8/1988 |
| EP | 0 642 933 | A1 | 3/1995 |
| HU | 203 212 | A | 8/1986 |
| HU | 1146 | U | 9/1997 |
| JP | 10-202999 | A | 8/1998 |
| JP | 2000-118119 | A | 4/2000 |

* cited by examiner

*Primary Examiner*—Willmon Fridie, Jr.
(74) *Attorney, Agent, or Firm*—Birch, Stewart, Kolasch & Birch, LLP

(57) ABSTRACT

An authenticity discriminable printed matter in which a latent image cannot be visually identified under ordinary visible light but appears upon being irradiated with UV rays. A basic image is formed on a base material. The basic image is made of a latent image portion and latent image peripheral portion. The latent image portion and latent image peripheral portion cannot be visually discriminated, and each of them is formed from a set of dots continuously laid out at a predetermined period. The resolution of the dots of the latent image portion is different from that of the dots of the latent image peripheral portion. The latent image portion and latent image peripheral portion have the same percent dot area per unit area and different dot peripheral lengths (contour lengths) per unit area. The latent image portion and latent image peripheral portion are printed by color fluorescent ink, thus obtaining printed matter.

42 Claims, 27 Drawing Sheets

BACKGROUND PORTION HAS DENSITY OF 40% AND 60 LINES

| NUMBER OF LINES OF LATENT IMAGE PORTION | 120 LINES 40% | 170 LINES 40% | 220 LINES 40% | 270 LINES 40% | 320 LINES 40% | 370 LINES 40% | 420 LINES 40% |
|---|---|---|---|---|---|---|---|
| LATENT IMAGE EFFECT OF FLUORESCENT LIGHT | △ | ○ | ○ | ○ | ○ | ○ | ○ |

FIG. 6A

BACKGROUND PORTION HAS DENSITY OF 40% AND 70 LINES

| NUMBER OF LINES OF LATENT IMAGE PORTION | 90 LINES 40% | 140 LINES 40% | 190 LINES 40% | 240 LINES 40% | 290 LINES 40% | 340 LINES 40% | 390 LINES 40% |
|---|---|---|---|---|---|---|---|
| LATENT IMAGE EFFECT OF FLUORESCENT LIGHT | × | △ | ○ | ○ | ○ | ○ | ○ |

FIG. 6B

BACKGROUND PORTION HAS DENSITY OF 40% AND 80 LINES

| NUMBER OF LINES OF LATENT IMAGE PORTION | 110 LINES 40% | 160 LINES 40% | 210 LINES 40% | 260 LINES 40% | 310 LINES 40% | 360 LINES 40% | 410 LINES 40% |
|---|---|---|---|---|---|---|---|
| LATENT IMAGE EFFECT OF FLUORESCENT LIGHT | × | △ | ○ | ○ | ○ | ○ | ○ |

FIG. 6C

| LINE IMAGE DESIGN IMAGE LINE WIDTH 100b(μm) / CALCULATION VALUE/VISUAL EFFECT | 90 | 80 | 70 | 60 | 50 | 40 |
|---|---|---|---|---|---|---|
| IMAGE LINE WIDTH OF PORTION HAVING LATENT IMAGE 100a(μm) | 111 | 125 | 143 | 167 | 200 | 250 |
| IMAGE LINE PERIPHERAL LENGTH OF PORTION HAVING LATENT IMAGE IN ONE PERIOD 100B ①(μm) | 402 | 410 | 426 | 454 | 500 | 580 |
| IMAGE LINE PERIPHERAL LENGTH RATIO ①/400 | 1.005 | 1.025 | 1.065 | 1.135 | 1.250 | 1.450 |
| VISUAL EFFECT (LIGHT EMISSION INTENSITY) | × | × | △ | ○ | ○ | ○ |

CALCULATION VALUES OBTAINED WHEN IMAGE LINE WIDTH 100A IS SET TO 100μm, ONE PERIOD 100B TO 100μm, AND NON-IMAGE LINE PORTION 100C TO (100−b)μm

FIG. 24

AUTHENTICATABLE PRINTED MATTER, AND METHOD FOR PRODUCING THE SAME

This application is the national phase under 35 U.S.C. § 371 of PCT International Application No. PCT/JP01/04846 which has an International filing date of Jun. 8, 2001, which designated the United States of America.

BACKGROUND OF THE INVENTION

The present invention relates to printed matter such as securities including banknotes, stock certificates, and bonds, various kinds of certificates, and important documents which must not be forged or altered, in which a latent image that can hardly be recognized under ordinary visible light becomes visible when the printed matter is irradiated with a predetermined wavelength such as UV rays, or if the printed matter is copied by a copying machine, a latent image formed from anti-copy image lines becomes visible even without irradiation of a predetermined wavelength such as UV light whereby the authenticity can be discriminated.

PRIOR ART

For printed matter such as securities including banknotes, stock certificates, and bonds, various kinds of certificates, and important documents, measures against forgery and alteration are important. The measures against forgery and alteration of such printed matter mainly include a method of forming a variety of geometric patterns to make a complex design and a method of executing certain processing for printed matter to make an unnoticeable latent image visible.

Typical examples of the former method are ground tints, lathe works, and relief. These are widely used for design of securities and the like. Typical examples of the latter are latent image intaglio printing, functional ink or florescent ink using a color that cannot be normally reproduced by a copying machine, and anti-copy image lines formed from fine image lines that are irreproducible by a copying machine.

The former measures against forgery and alteration, which use geometric pattern, include ground tints, lathe works, and relief. These patterns are formed by sets of curved image lines having predetermined image line widths. While placing emphasis on the design of printed pattern, these patterns are complicated as the measures against forgery and alteration so as to make it difficult to form similar patterns in forged articles. The patterns also use colors that are hard to extract by a photomechanical process machine or to reproduce by a copying machine. Alternatively, complex curved image lines are used such that a moiré is generated for the scanning input/output of a copying machine or scanner, which also improves the effect of the measures against forgery. Hence, ground tints, lathe works, relief, and the like are indispensable in terms of design of printed matter including securities such as banknotes, stock certificates, and bonds, various kinds of certificates, and important documents. Recently, however, the patterns cannot sufficiently prevent forgery and alteration because they could be forged or altered by highly advanced DTP technology and copying machines.

Typical techniques for executing certain processing for printed matter to make an unnoticeable latent image visible are latent image intaglio printing, functional ink or florescent ink using a color that cannot be normally reproduced by a copying machine, anti-copy image lines, and the like.

In printed matter using fluorescent ink, the images of printed matter using color fluorescent ink can be recognized under ordinary visible light. When such printed pattern is irradiated with a predetermined wavelength such as UV rays, the image emits light, and thereby its authenticity can be discriminated.

However, only light emission by the image irradiated with a predetermined wavelength such as UV rays cannot sufficiently prevent forgery. The images of printed pattern using colorless fluorescent ink cannot be recognized under ordinary visiblelight. When such printed pattern is irradiated with a predetermined wavelength such as UV rays, the image emits light. Although this provides a high anti-forgery effect, printing using colorless florescent ink is very difficult in fitting because the ink is colorless. In addition, overprinting increases the material costs and the number of printing steps. also, to discriminate the authenticity of a copy, an apparatus capable of irradiating the copy with a predetermined wavelength such as UV rays is necessary. This apparatus requires an installation space and equipment cost.

In anti-copy printed matter with a latent image printed by fluorescent ink, orange fluorescent ink is used as one of the coloring materials for the latent image portion and background portion, and ink having a color tone that is visually recognized as almost the same as that of the orange florescent ink is used as the other coloring material (Japanese Patent Laid-Open No. 7-76195). However, it is difficult to mix the ink having the color tone that is visually recognized almost the same as that of the orange florescent ink. In addition, fitting is difficult, and overprinting increases the material costs and the number of printing steps.

As a method of forming a latent image using an image line pattern, the present applicant has proposed printed pattern (Japanese Patent Laid-Open No. 8-197828) where, for a collective pattern of curved image lines, a portion having no latent image is expressed by one line, and a portion having a latent image is expressed by two or more lines. The total image line width of the two or more image lines of the portion having a latent image equals the image line width of one image line of the portion having no latent image.

In this printed pattern, the latent image cannot be easily identified before making a copy of the original. When the printed pattern is copied by a copying machine, the background portion is reproduced, though the pattern having the latent image is not reproduced. For this reason, if the printed pattern is copied by a copying machine or the like, the authenticity discrimination effect can be obtained. However, unless the printed pattern is copied by a copying machine or the like, the authenticity cannot be visually discriminated.

The present applicant has also proposed printed pattern (Japanese Patent Laid-Open No. 9-240135) where, for a collective pattern like curved lines, an image line of a portion having no latent image is formed from a solid line, and an image line of a portion having a latent image is formed from a periodic broken line made of image lines arrayed in the direction of a reference line at a predetermined interval. The sum of the image line areas of portions corresponding to one period, i.e., an image line portion and a non-image line portion, which are included in the periodic broken lines having a latent image and continue in the direction of the reference line, equals the image line area of a portion in the solid lines having no latent image, which has a length corresponding to that period in the direction of reference line.

In this printed pattern, the latent image cannot be easily identified before making a copy of the orignal. When the printed pattern is copied by a copying machine, the background portion is reproduced, though the pattern having the latent image is not reproduced. For this reason, if the printed pattern is copied by a copying machine or the like, the authenticity discrimination effect can be obtained. However, unless the printed pattern is copied by a copying machine or the like, the authenticity cannot be visually discriminated.

Some printed pattern suitable for against forgery by a copying machine have a latent image formed from sparse and dense screen patterns of dots or single lines. For example, using a latent image plate having a latent image made of dots at a resolution of 150 lines/inch and percent dot area of 10% (dots comprising 10% of the latent image area) and a background made of single lines at a resolution of approximately 50 to 60 lines/inch and percent dot area of about 10% on the blank surface area (dots compressing 10% of the blank surface area) around the latent image, deep color printing is executed on a sheet surface. Then, using an overprint plate having a wave pattern made of parallel lines that form a moiré pattern upon interfering with the single lines on the background, overprinting of a light color that is not reproduced by a copying machine is executed on the sheet surface.

Since a moiré pattern that dazzles eyes is formed on the surface of the printed pattern, the latent image cannot be easily identified. When the printed pattern is copied by a copying machine, only the background is reproduced while the latent image and wave pattern are not reproduced. Hence, the latent image can be discriminated separately from the background. Such anti-copy latent image camouflage (Japanese Patent Laid-Open No. 60-87380) has been proposed.

In this printed pattern, however, the latent image is formed from a screen pattern and can therefore be visually recognized easily. In a one-color print, information such as characters overwritten must play a role of camouflage. The pattern can be used only as a ground tint, i.e., the background for characters or the like. Hence, the one-color print image line pattern having a latent image cannot be used as a designed pattern like a lathe work. In addition, the pattern cannot be used to make artistic decorative printed pattern.

This method requires sparse and dense screen patterns of dots or lines, i.e., dots or single lines. Hence, this method is not suitable for existing products such as banknotes, stock certificates, and bonds having a variety of ground tints and lathe works.

As a method of forming a latent image using an image line pattern, the present applicant has also proposed printed pattern (Japanese Patent Laid-Open No. 9-240135) where, for a collective pattern like curved lines, an image line of a portion having no latent image is formed from a solid line, and an image line of a portion having a latent image is formed from a periodic broken line made of image lines arrayed in the direction of reference line at a predetermined interval. The sum of the image line areas of portions corresponding to one period, i.e., an image line portion and a non-image line portion, which are included in the periodic broken lines having a latent image and continue in the direction of the reference line, equals the image line area of a portion in the solid lines having no latent image, which has a length corresponding to that period in the direction of reference line.

In this printed pattern, normally, the latent image cannot be easily identified before making a copy of the original. When the printed pattern is copied by a copying machine, the background portion is reproduced, though the pattern having the latent image is not reproduced. Hence, the latent image is formed.

If the printed pattern is copied by a copying machine or the like, the authenticity discrimination effect can be obtained. However, unless the printed pattern is copied by a copying machine or the like, the authenticity cannot be visually discriminated. Additionally, the recent color copying machines have much higher resolution than before. Hence, if an official report is copied by a high-quality copying machine, a latent image may not appear clearly.

The present invention has been made to solve the above-described problems, and to propose printed pattern in which a latent image that is unnoticeable under ordinary visible light becomes visible when the printed pattern is irradiated with a predetermined wavelength such as UV rays, or if the printed pattern is copied, its authenticity can easily be discriminated using a compact portable UV ray irradiation apparatus without using any bulky authentication apparatus, and the problem of fitting and the problems of the increase in cost of materials and the increase in number of printing steps by overprinting can be solved, and a method of generating the printed pattern.

SUMMARY OF THE INVENTION

The present invention, provides authenticity discriminable printed pattern in which a latent image formed on a collective pattern cannot be visually identified easily under ordinary visible light but becomes visible upon being irradiated with UV rays, wherein a basic image is formed on a base material, the basic image has a latent image portion and a latent image peripheral portion, the latent image portion and latent image peripheral portion are difficult to discriminated under the ordinary visible light, each of the latent image portion and latent image peripheral portion is formed from a set of dots continuously laid out at a predetermined period, a resolution of the dots of the latent image portion is different from that of the dots of the latent image peripheral portion, the latent image portion and latent image peripheral portion have the same percent dot area per unit area and different dot peripheral lengths per unit area, (sum of peripheral length of all dots in the unit area), and the latent image portion and latent image peripheral portion are printed by color fluorescent ink.

The dot peripheral length per unit area of the dots of the latent image portion is preferably not less than twice the dot peripheral length per unit area of the dots of the latent image peripheral portion.

The dot can have one of a square dot shape, chain dot shape, round dot shape, and a combination thereof.

A camouflage pattern may be further printed on the printed pattern.

The present invention, also provided a method of generating authenticity discriminable printed pattern in which a latent image that is formed on a collective pattern cannot be visually identified easily under ordinary visible light but becomes visible upon being irradiated with UV rays, wherein a basic image is formed on a base material, the basic image has a latent image portion and a latent image peripheral portion, the latent image portion and latent image peripheral portion are difficult to discriminated under the ordinary visible light, each of the latent image portion and latent image peripheral portion is formed from a set of dots continuously laid out at a predetermined period, a resolution of the dots of the latent image portion is different from that of the dots of the latent image peripheral portion, and the latent image portion and latent image peripheral portion have the same percentage of dot area per unit area and different dot peripheral lengths per unit area, and the latent image portion and latent image peripheral portion are printed with color fluorescent ink.

The present invention, provides authenticity discriminable printed pattern in which a latent image formed on a curved collective pattern cannot be visually identified easily under ordinary visible light but becomes visually upon being irradiated with UV rays, wherein the curved collective pattern is formed from one image line having no latent image and a plurality of branched image lines which have the latent image and are visually recognized as one solid line, the curved collective pattern is designed so as to make a sum of image line widths of the plurality of branched image lines substantially equal an image line width of the one image line and a sum of image line peripheral lengths in a predetermined length of the plurality of branched image lines in a direction of curved reference line different from a sum of image line peripheral lengths in the predetermined length of the one image line in the direction of curved reference line, and the one image line and the plurality of branched image lines are printed by color fluorescent ink.

The sum of the image line widths of the plurality of branched image lines preferably falls within a range of 90% to 110% of the image line width of the one image line.

The sum of the image line peripheral lengths per unit printing area of the plurality of branched image lines is preferably not less than 1.4 times the sum of the image line peripheral lengths per unit printing area of the one image line.

At a portion where image lines of the one image line, image lines of the plurality of branched image lines, or the one image line and the plurality of branched image lines cross, one of the crossing image lines may be deleted at the overlapping portion of the crossing region.

The curved collective pattern may be one of a ground tint pattern, lathe work pattern, relief pattern, and a combination thereof.

According to the present invention, there is also provided a method of generating authenticity discriminable printed pattern in which a latent image that is formed on a curved collective pattern cannot be visually identified easily under ordinary visible light but becomes visible upon being irradiated with UV rays, wherein the curved collective pattern is formed from one image line having no latent image and a plurality of branched image lines which have the latent image and are visually recognized as one solid line, the curved collective pattern is designed so as to make a sum of image line widths of the plurality of branched image lines substantially equal an image line width of the one image line and to make a sum of image line peripheral lengths in a predetermined length of the plurality of branched image lines in a direction of curved reference line different from a sum of image line peripheral lengths in the predetermined length of the one image line in the direction of curved reference line, and the one image line and the plurality of branched image lines are printed by color fluorescent ink.

The present invention, provides authenticity discriminable printed pattern in which a latent image formed on a curved collective pattern cannot be visually identified easily under ordinary visible light but becomes visible upon being irradiated with UV rays, wherein the curved collective pattern is made of an image line formed from a solid line having no latent image and an image line formed from a periodic broken line having the latent image, the periodic broken line being formed from image lines which have a predetermined shape and are visually recognized as one continuous line and laid out in a direction of curved reference line, the curved collective pattern is designed so as to make an image line area of a portion formed from one image line portion and one non-image line portion corresponding to one period of the periodic broken line substantially equal an image line area of the solid line having a length corresponding to one period of the periodic broken line and an image line peripheral length of the portion formed from one image line portion and one non-image line portion corresponding to one period of the periodic broken line different from an image line peripheral length of the solid line corresponding to one period of the periodic broken line, and the image line formed from the solid line and the image line formed from the periodic broken line are printed by color fluorescent ink.

The image line area of the portion corresponding to one period of the periodic broken line preferably falls within a range of 90% to 110% of the image line area of a portion of the solid line corresponding to the same length as one period in the periodic broken line.

The image line peripheral length of the portion corresponding to one period of the periodic broken line is preferably not less than 1.1 times that of the image line peripheral length of the portion of the solid line corresponding to the same length as one period in the periodic broken line.

At a portion where image lines formed from the solid lines, image lines formed from periodic broken lines, an image line formed from the solid line and an image line formed from the periodic broken line cross, one of the crossing image lines may be deleted at the overlapping portion.

The curved collective pattern can be one of a ground tint pattern, lathe work pattern, relief pattern, and a combination thereof.

According to the present invention, there is also provided a method of generating authenticity discriminable printed pattern in which a latent image that is formed on a curved collective pattern cannot be visually identified easily under ordinary visible light but becomes visible upon being irradiated with UV rays, wherein the curved collective pattern is made of an image line formed from a solid line having no latent image and an image line formed from a periodic broken line having the latent image, the periodic broken line being formed from image lines which have a predetermined shape and are visually recognized as one solid line and laid out in a direction of curved reference line, the curved collective pattern is designed so as to make an image line area of a portion formed from one image line portion and one non-image line portion corresponding to one period of the periodic broken line substantially equal an image line area of the solid line having a length corresponding to one period of the periodic broken line and an image line peripheral length of the portion formed from one image line portion and one non-image line portion corresponding to one period of the periodic broken line different from an image line peripheral length of the solid line corresponding to one period of the periodic broken line, and the image line formed from the solid line and the image line formed from the periodic broken line are printed by color fluorescent ink.

The present invention, provides authenticity discriminable printed pattern in which a latent image is formed on an image line pattern formed from one or a plurality of image lines using a straight line or curved line as an image line portion, wherein an image line of a portion having no latent image in the image line pattern is formed from a solid line, an image line of a portion having the latent image is formed from image lines made of broken lines obtained by using a reference line as a central portion of the solid line as a reference, substantially equidistantly branching the image line into a plurality of image lines in a direction perpendicular to the reference line, and dividing each of the plurality of branched image lines in a direction substantially perpendicular to the reference line, in this invention, the broken lines are formed from image lines for which a sum of image line areas of the image lines having a length of a portion corresponding to one period formed from an image line portion and a non-image line portion of the broken line divided in the direction of reference line in the broken lines of the portion having the latent image substantially equals an image line area of the solid line of a portion corresponding to the same length as one period in the broken lines divided in the direction substantially perpendicular to the reference line in the solid line of the portion having no latent image, and the image line of the portion having no latent image and the broken lines of the portion having the latent image are printed by color fluorescent ink.

The image lines of the portion having the latent image may be periodic broken lines made of broken lines having an overall shape obtained by using the reference line as the central portion of the solid line as the reference, substantially equidistantly branching the image line into a plurality of image lines in the direction perpendicular to the reference line, dividing each of the plurality of branched image lines in the direction substantially perpendicular to the reference line, and laying out the image lines at a substantially predetermined interval; periodic broken lines juxtaposed at a shifted period, in which using the reference line as the central portion of the solid line as the reference, the image lines are substantially equidistantly branched into a plurality of image lines in the direction perpendicular to the reference line, the plurality of branched image lines are formed from broken lines divided in the direction substantially perpendicular to the reference line and laid out at a predetermined interval, and at least one of the plurality of branched image lines is shifted from the remaining branched image lines; or periodic broken lines juxtaposed at different periods, in which using the reference line as the central portion of the solid line as the reference, the image lines are substantially equidistantly branched into a plurality of image lines in the direction perpendicular to the reference line, the plurality of branched image lines are formed from broken lines divided in the direction substantially perpendicular to the reference line and laid out at a predetermined interval, and at least one of the plurality of branched image lines is laid out at a period different from that of the remaining branched image lines.

The sum of image line areas of the image lines having the length of the portion corresponding to one period formed from the image line portion and the non-image line portion of the broken line divided in the direction perpendicular to the reference line in the broken lines of the portion having the latent image preferably falls within a range of 95% to 110% of an image line area substantially equal to the image line area of the solid line of the portion corresponding to the same length as one period in the broken lines divided in the direction substantially perpendicular to the reference line in the solid line of the portion having no latent image.

At a portion where the image lines of the portion having no latent image, the broken lines, the periodic broken lines, the periodic broken lines juxtaposed at the shifted period, the periodic broken lines juxtaposed at the different periods, or any two kinds of the image lines cross, one of the crossing image lines may be deleted.

The image line pattern may be at least one of a ground tint pattern, lathe work pattern, and relief pattern.

The present invention, also provided a method of generating authenticity discriminable printed pattern in which a latent image is formed on an image line pattern formed from one or a plurality of image lines using a straight line or curved line as an image line portion, wherein an image line of a portion having no latent image in the image line pattern is formed from a solid line, an image line of a portion having the latent image is formed from image lines made of broken lines obtained by using a reference line as a central portion of the solid line as a reference, substantially equidistantly branching the image line into a plurality of image lines in a direction perpendicular to the reference line, and dividing each of the plurality of branched image lines in a direction substantially perpendicular to the reference line, In this invention the broken lines are formed from image lines for which a sum of image line areas of the image lines having a length of a portion corresponding to one period formed from an image line portion and a non-image line portion of the broken line divided in the direction of reference line in the broken lines of the portion having the latent image substantially equals an image line area of the solid line of a portion corresponding to the same length as one period in the broken lines divided in the direction substantially perpendicular to the reference line in the solid line of the portion having no latent image, and the image line of the portion having no latent image and the broken lines of the portion having the latent image are printed by color fluorescent ink.

BRIEF DESCRIPTION OF THE DRAWINGS

FIGS. 6A, 6B, and 6C are tables showing the evaluation results of samples formed in accordance with the first embodiment;

FIG. 24 is a table showing the evaluation results of samples formed in accordance with the third embodiment;

DESCRIPTION OF THE PREFERRED EMBODIMENTS

(1) First Embodiment

The first embodiment of the present invention will be described below with reference to the accompanying drawings.

The first embodiment is related to authenticity discriminable printed pattern in which a latent image formed in a collective pattern and is invisible under ordinary visible light becomes visible upon being irradiated with UV rays.

Figure 1:
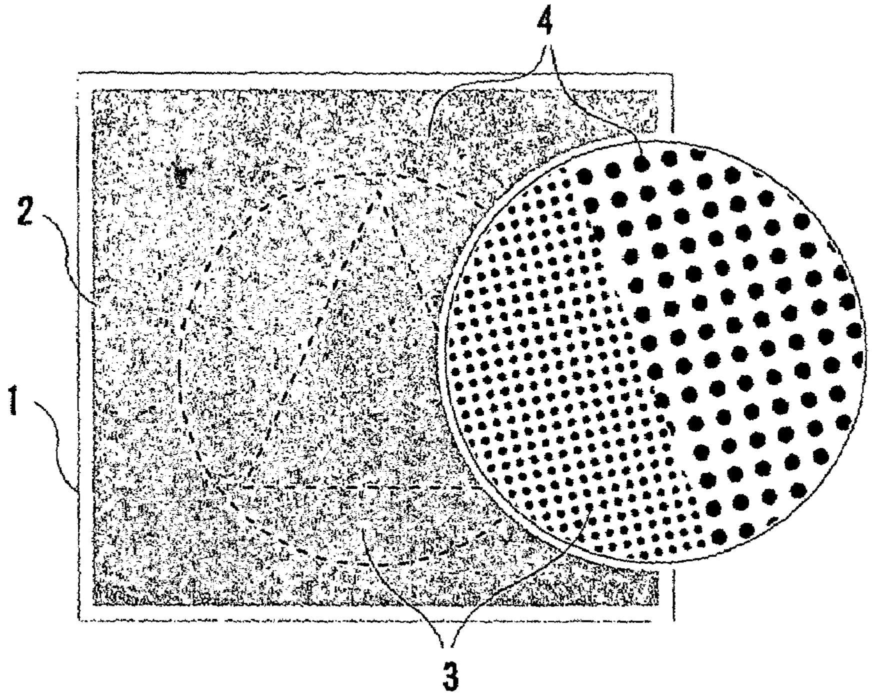
FIG. 1 shows an explanatory view and a partial enlarged view showing the basic arrangement of the first embodiment of the present invention.

As shown in FIG. 1, a basic image 2 having a uniform density is formed on a base material 1. The basic image 2 has a latent image portion 3 and latent image peripheral portion 4. The latent image portion 3 and latent image peripheral portion 4 cannot be discriminated under ordinary visible light. When the latent image portion 3 and latent image peripheral portion 4 are irradiated with UV rays, the latent image becomes visible. The latent image portion 3 and latent image peripheral portion 4 are formed from a set of dots continuously laid out at a predetermined period. The dots in the latent image portion 3 have a resolution different from that of the dots in the latent image peripheral portion 4. The percentage dot area per unit area in the latent image portion 3 equals that in the latent image peripheral portion 4. The dot peripheral length per unit area (sum of contour length of all dots in the unit area) in the latent image portion 3 is different from that in the latent image peripheral portion 4. The latent image portion 3 and latent image peripheral portion 4 are printed using color fluorescent ink.

For example, the image line portion has a dense structure, (i.e. more dots per unit area) and the latent image peripheral portion has a sparse structure. (i.e. fewer dots per unit area). This printed pattern is irradiated with a predetermined wavelength such as UV rays. The dot peripheral length per unit area of the dots in the latent image peripheral portion 4 having the sparse structure is smaller than that of the dots in the latent image portion 3 having the dense structure. For this reason, the brightness the fluorescent light emission of the latent image peripheral portion 4 is low. Conversely, the dot peripheral length per unit area of the dots in the latent image portion 3 having the dense structure is larger than that of the dots in the latent image peripheral portion 4 having the sparse structure. For this reason, the brightness of fluorescent light emission of the latent image portion 3 is high. The latent image portion 3 can be recognized because there is a difference in brightness of fluorescent light emission between the latent image portion 3 and the latent image peripheral portion 4.

In the first embodiment, the dot peripheral length per unit area of the dots in the latent image portion must be different from that in the latent image peripheral portion. If the dot peripheral length per unit area of the dots in the latent image portion is less than twice the dot peripheral length per unit area in the latent image peripheral portion, there will be only a small difference in brightness of fluorescent light emission between the latent image portion 3 and the latent image peripheral portion 4 when they are irradiated with a predetermined wavelength such as UV rays. For this reason, the latent image portion cannot be visually recognized easily. To prevent this, the dot peripheral length per unit area of the dots in the latent image portion is preferably twice or more the dot peripheral length per unit area in the latent image peripheral portion.

The dot resolution of the latent image peripheral portion having the sparse structure is preferably 60 to 80 lines/inch. To prevent dot contact, the percent dot area of the latent image peripheral portion is preferably 20% to 45%. The dot resolution of the latent image portion having the dense structure is preferably 120 to 420 lines/inch. To prevent dot contact, the percent dot area of the latent image portion is preferably 20% to 45%. For example, assume that the latent image peripheral portion is formed using dots at a resolution of 80 lines/inch and a percent dot area of 40% (square dots).

The 80 lines are formed from a 312.5 μm matrix (80 lines times 312.5 μm is approximately one inch, thus making the resolution 80 lines/inch). One of the dots at a percent dot area of 40% has a 125 μm for the length of a square dot. For the dots to be used for the latent image portion, the number of lines must be preferably twice or more that of the latent image peripheral portion. Hence, the latent image portion is formed using dots at a resolution of 160 lines/inch and a percent dot area of 40% (square dots). The 160 lines in the latent image portion are formed from a 156.3 μm matrix. One of the dots at a resolution of 160 line per inch and a percent dot area of 40% has a 62.5 μm for the length of a square dot. The peripheral length of one of the dots at the resolution of 80 lines/inch and percent dot area of 40% is 500 μm. The peripheral length of one of the dots at the resolution of 160 lines/inch and percent dot area of 40% is 250 μm. The number of dots in a 1-inch square is 6,400 for the 80-line resolution and 25,600 for the 160-line resolution. The peripheral length of dots in a 1-inch square is 3,200 mm for the 80-line resolution and 6,400 mm for the 160-line resolution. As can be seen, the peripheral length per inch of the latent image portion is twice that of the latent image peripheral portion.

In the first embodiment, either the dots of the latent image portion or those of the latent image peripheral portion may be formed to have a dense structure, while the remaining dots may be formed to have a sparse structure. For example, when the latent image portion is formed to have a sparse structure, and the latent image peripheral portion is formed to have a dense structure, the brightness of fluorescent light emission of the latent image portion and latent image peripheral portion are reversed. This printed pattern is irradiated with a predetermined wavelength such as UV rays. The dot peripheral length per unit area of the dots in the latent image portion having the sparse structure is smaller than that of the dots in the latent image peripheral portion having the dense structure. For this reason, the brightness of the fluorescent light emission of the latent image portion is low. Conversely, the dot peripheral length per unit area of the dots in the latent image peripheral portion having the dense structure is larger than that of the dots in the latent image portion having the sparse structure. For this reason, the brightness of the fluorescent light emission of the latent image peripheral portion is high. The latent image portion can be recognized because there is a difference in the brightness of the fluorescent light emission between the latent image portion and the latent image peripheral portion.

In addition, when the printed pattern of the first embodiment is generated using the dot structure of a conventional anti-copy pattern, an anti-copy effect can be obtained.

The camouflage pattern of the first embodiment can be printed either on or under the basic image. A ground tint pattern, lathe work pattern, image line pattern, and the like are preferable. The pattern may have a hue different from that of the basic image.

As for the brightness of florescent light emission by the color fluorescent ink, when the printed pattern is irradiated with UV rays, the intensity of fluorescent light emission sensible to an eye changes depending on the change in dot peripheral length (contour length) per unit printing area of the printed pattern. Hence, it is indispensable to print the latent image peripheral portion and latent image portion using color fluorescent ink. The fluorescent material of the color fluorescent ink is excited at a predetermined wavelength such as UV rays and increases light diffusion at the time of fluorescent light emission. With this method, an image that is unnoticeable under ordinary visible light but can be visually recognized upon being irradiated with a predetermined wavelength such as UV rays can be formed.

As the dots, square dots, chain dots, or round dots, or a combination thereof can be used. The same effect as described above can also be obtained by using a set of invisible microstructure elements such as microcharacters or special marks.

Any material such as paper or plastic sheets can be used as the base material as long as it can be subjected to printing. Valuable documents, cards, or the like may be used as the base material.

To obtain printed pattern having a uniform density, the expansion value (or contraction value) of the dots or microelements due to expansion of ink in printing is preferably taken into consideration.

Figure 2:
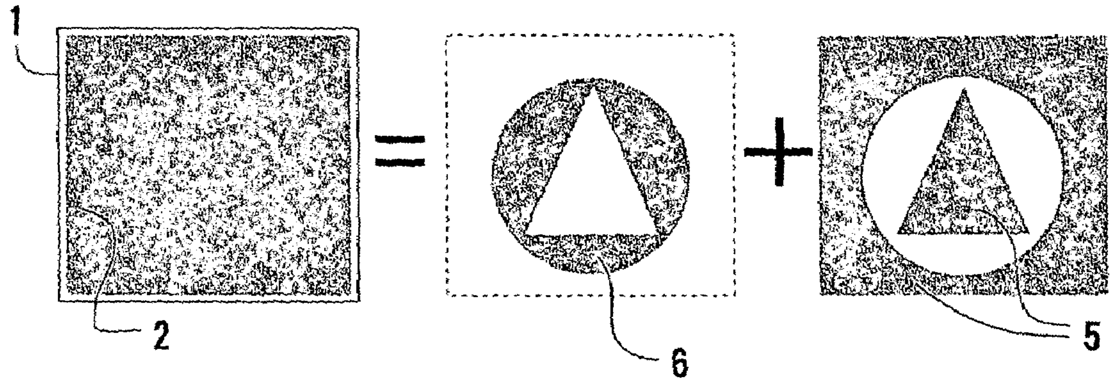
FIG. 2 is an explanatory view showing a portion having no latent image and a portion having no latent image in the first embodiment of the present invention.
Figure 3:
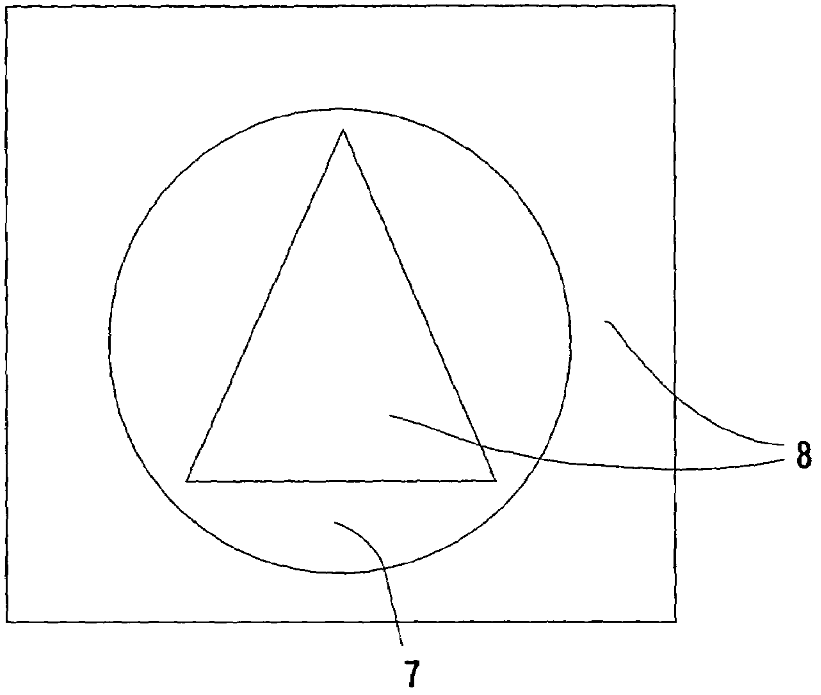
FIG. 3 is an explanatory view showing the first embodiment in which the latent image pattern portion and latent image peripheral portion are set on a two-dimensional coordinate system using CGS.

The dot structure of the authenticity discrimination pattern of the first embodiment will be described in more detail. As shown in FIG. 2, the authenticity discrimination pattern having the dot structure of the first embodiment has a latent image peripheral portion 5 having no latent image and a latent image portion 6. A case wherein the latent image peripheral portion and latent image portion were formed using a commercially available computer graphic design apparatus (to be referred to as a CGS hereinafter) will be described.

To do dot design at the time of plate making in consideration of the expansion value (or contraction value) of image lines due to expansion of ink in printing, the expansion value (or contraction value) was investigated in advance by test printing. For test printing, square dots having resolutions of 80, 160, 210, 260, and 310 lines/inch were output from a commercially available image setter to plate making films at a density of 40% to form printing plates using a positive type PS. Next, 475 g of commercially available beige ink were mixed with 25 g of green fluorescent pigment (Lumikol 1000: Nippon Keikou Kagaku KK) to prepare color fluorescent ink. Using the printing plates and color fluorescent ink thus obtained, dots were printed on commercially available wood free paper sheets (paper sheets containing no fluorescent whitening agent) by an offset press.

The dots of the printed pattern obtained by test printing were measured. The percent dot areas were 43% for dots at a resolution of 80 lines/inch, 44% for 160 lines/inch, 45% for 210 lines/inch, 46% for 260 lines/inch, and 47% for 310 lines/inch. Hence, the expansion values were 3% for 80 lines/inch, 4% for 160 lines/inch, 5% for 210 lines/inch, 6% for 260 lines/inch, and 7% for 310 lines/inch.

Figure 8:
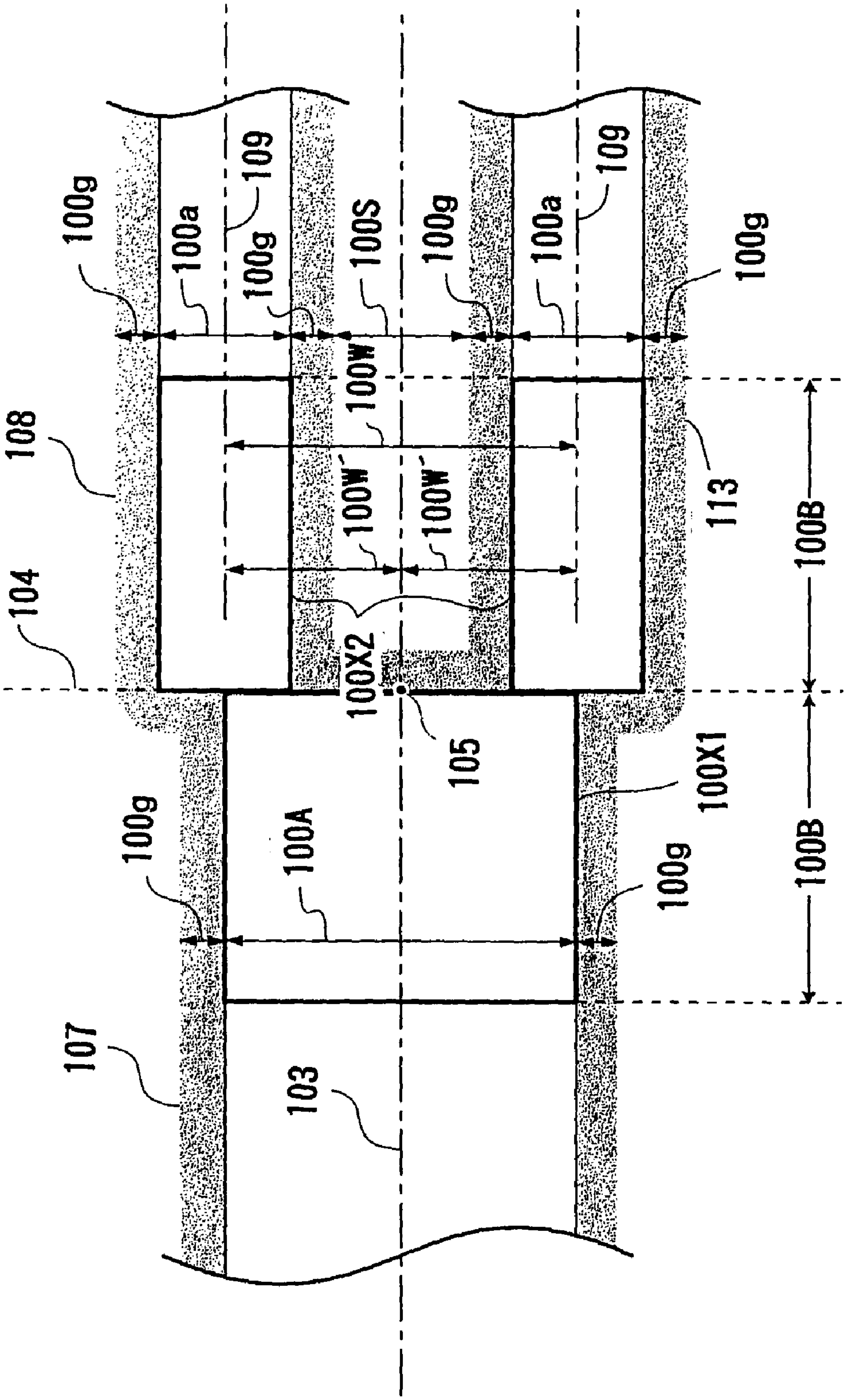
FIG. 8 is an enlarged view of the non-latent image line and branched latent image lines in the second embodiment.

Printing plates to be used to obtain the printed pattern of the first embodiment were prepared using the expansion values for the respective number of lines, which were obtained by test printing. First, using a commercially available CGS, a latent image pattern portion 7 and latent image peripheral portion 8 as shown in FIG. 8 were set on a two-dimensional coordinate system, and the numbers of lines and density settings were input. Assume that the latent image peripheral portion is set to a density of 40% at 80 lines/inch. For the latent image portion using dots at 160 lines/inch, the value to be substituted here is 39% because the expansion value obtained by test printing must be taken into consideration.

Figure 4:
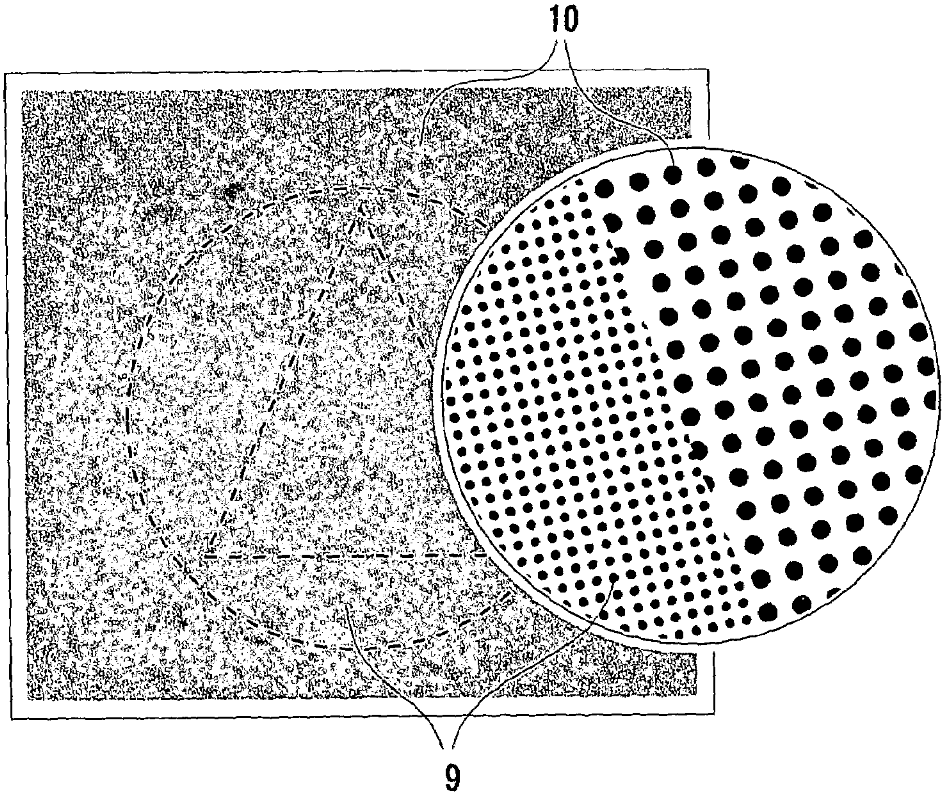
FIG. 4 is an explanatory view showing printed pattern according to the first embodiment.

Next, the dots were output from a commercially available image setter to plate making films to form printing plates using a positive type PS. FIG. 4 shows printed pattern obtained by printing dots on a commercially available wood free paper sheet by an offset press using color fluorescent ink. The obtained printed pattern has an authenticity discrimination pattern 9 formed from dense dots (160 lines/inch; 39%) and a latent image peripheral portion 10 formed from sparse dots (80 lines/inch; 40%).

The printed pattern shown in FIG. 4 is visually observed. The resolution per inch in the authenticity discrimination pattern 9 formed from the dense dots is different from that in the latent image peripheral portion 10 formed from the sparse dots. However, the authenticity discrimination pattern 9 and latent image peripheral portion 10 have similar percentage of dot area per unit area. For this reason, it is very difficult to discriminate the authenticity discrimination pattern 9 from the latent image peripheral portion 10.

Figure 5:
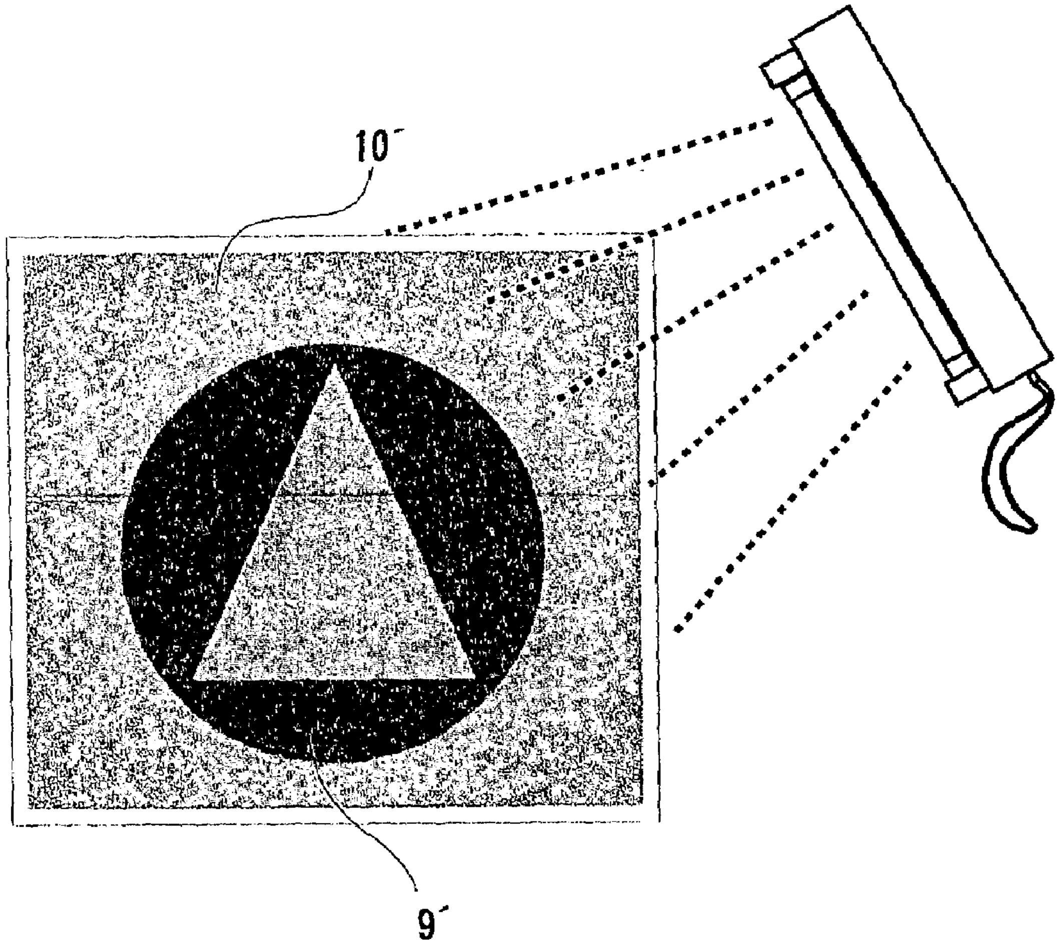
FIG. 5 is an explanatory view showing a state wherein the printed pattern according to the first embodiment is irradiated with UV rays.

FIG. 5 shows a state wherein the printed pattern is irradiated with UV rays having a wavelength of 365 nm using an UV irradiator (e.g., cordless fluorescent lamp BF-642 available from Matsushita Electric Industrial Co., Ltd). The brightness of fluorescent light emission of an authenticity discrimination pattern 9' made of dense dots is higher than that of a latent image peripheral portion 10' made of sparse dots. Since there is a difference in the brightness of the fluorescent light emission between the authenticity discrimination pattern 9' made of the dense dots and the latent image peripheral portion 10' made of the sparse dots, the authenticity discrimination pattern can be recognized.

Next, the latent image peripheral portion was set to a density of 40% at 60 lines/inch, 40% at 70 lines/inch, and 40% at 80 lines/inch. As samples, seven kinds of latent image portions were formed for each latent image peripheral portion. Observation experiments were conducted by irradiating the obtained samples with a predetermined wavelength such as UV rays. FIGS. 6A to 6C show the obtained experimental results. For evaluation, ○ is "effective", Δ is "effective to some extent", and x is "ineffective".

As shown in FIG. 6A, when the latent image peripheral portion is set to a density of 40% at 60 lines/inch, the latent image portion requires 120 or more lines/inch. As shown in FIG. 6B, when the latent image peripheral portion is set to a density of 40% at 70 lines/inch, the latent image portion requires 140 or more lines/inch. As shown in FIG. 6C, when the latent image peripheral portion is set to a density of 40% at 80 lines/inch, the latent image portion requires 160 or more lines/inch.

As described above, according to this embodiment, the latent image is almost unnoticeable under ordinary visible light. When the printed pattern is irradiated with UV rays, the dot peripheral length per unit area of the printed pattern changes. Hence, the lightness of fluorescent light emission by color fluorescent ink changes, and the intensity of fluorescent light emission sensible to an eye changes. Accordingly, since the latent image can be recognized, upon exposure to a predetermined wavelength, the authenticity can easily be discriminated.

In addition, since printing can easily be performed by one-color printing, the cost can be reduced. No camouflage pattern needs to be overprinted. Printing needs to be executed only once using visible color fluorescent ink. For this reason, no colorless fluorescent ink needs to be overprinted on printed pattern having anti-copy image lines. The problem of fitting can be solved, and the cost of materials and the number of printing steps can be reduced. In addition, since the density management, image line thickening adjustment, and the like in printing are facilitated, the allowable range in printing can be widened.

The curved collective pattern may be a ground tint pattern, lathe work pattern, relief pattern, or moiré pattern, or a combination thereof. Printed pattern having another kind of anti-forgery measure on the same image lines may be formed. The authenticity discrimination effect can also be obtained by forming an emboss pattern (three-dimensional pattern) after printing. Hence, this embodiment can be applied to securities including banknotes, stock certificates, and bonds, various kinds of certificates, and important documents which must not be forged or altered.

(2) Second Embodiment

The second embodiment is related to authenticity discriminable printed pattern in which a latent image that is formed in a curved collective pattern and is invisible under ordinary visible light becomes visible upon being irradiated with UV rays. The curved collective pattern is formed by one image line having no latent image and a plurality of branched image lines which have a latent image and are visually recognized as if they were one solid line.

Figure 7:
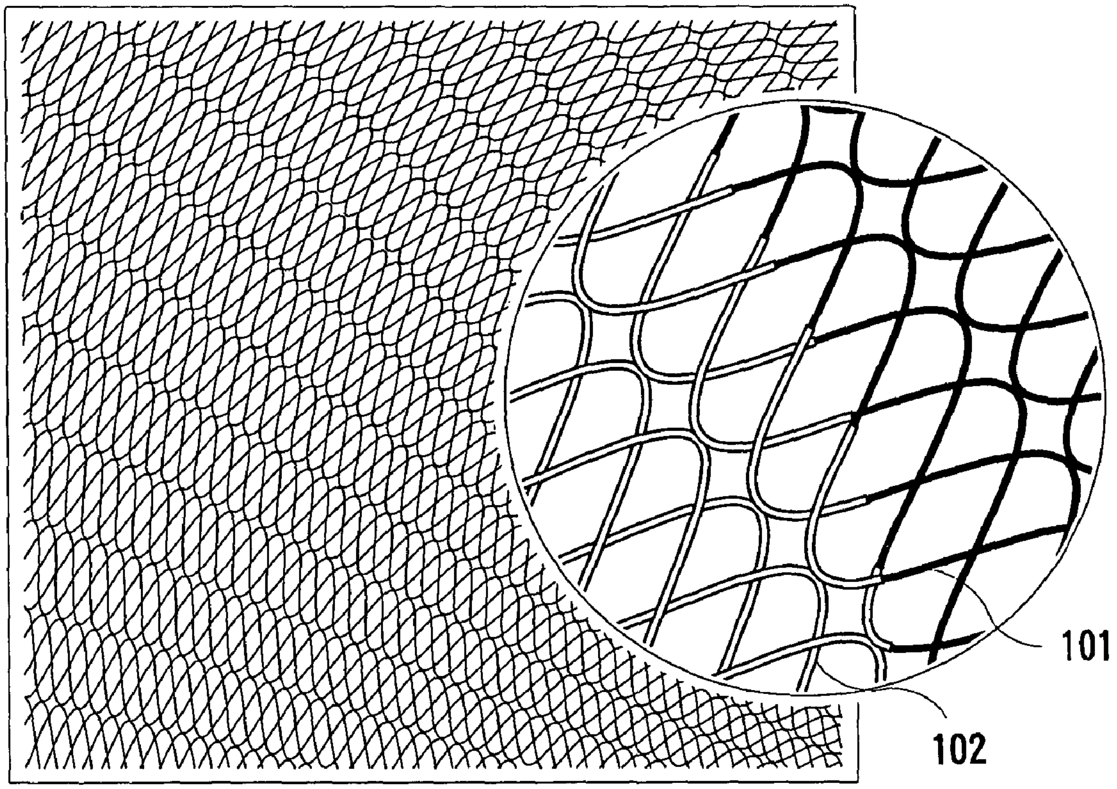
FIG. 7 shows an overall view and a partial enlarged view of an image line having no latent image and an image line having a latent image and branched into a plurality of lines in the second embodiment of the present invention.

As shown in FIG. 7, the image has one image line 101 having no latent image (to be referred to as a non-latent image line hereinafter), and a plurality of branched image lines 102 having a latent image (to be referred to as branched latent image lines hereinafter). The image line structure of the second embodiment will be described in more detail with reference to FIG. 8 assuming that the curved image lines are straight lines. FIG. 8 is an enlarged view of the boundary portion between the non-latent image line and the branched latent image lines assuming that they are made of straight lines and are in contact with each other.

Referring to FIG. 8, the total image line width of branched latent image lines 108 is made almost equal to the image line width of a non-latent image line 107. To do this, at the time of image line design, 100*a*=100A/n is set, where 100A is the image line width of the non-latent image line, 100*a* is the image line width of each of the branched latent image lines, and n is the number of branches of the branched latent image lines (n=2 in FIG. 8).

However, in printing an authenticity discrimination pattern having the image line structure of the second embodiment, a change in expansion value (or contraction value) of the image line width due to expansion of ink in printing is preferably taken into consideration for each of the image line widths of the branched latent image line and non-latent image line. More specifically, in calculating, at the time of image line width design, the above-described image line width to be influenced in printing, the expansion value (or contraction value) generated on one side of the image line due to expansion of ink in printing is defined as 100*g*. The image line width of the non-latent image line 107 on the printed pattern is given by 100A+100*g*+100*g*. The image line width of the branched latent image line 108 on the printed pattern is given by 100*a*+100*g*+100*g*. Hence, the image line width 100A of one non-latent image line and the image line width 100*a* of each branched latent image line only needs to satisfy a relationship given by 100*a*={100A−(100*g*+100*g*)(n−1)}/n.

In the image line structure of the authenticity discrimination pattern of the second embodiment, the branched latent image lines are branched from the non-latent image line. In addition, an interval 100S between the branched latent image lines 108 on the printed pattern is set to 25 to 60 μm such that the interval between the branched latent image lines 108 cannot be visually recognized. Accordingly, since the branched latent image lines 108 are visually recognized as one solid line. Hence, the branched latent image lines 108 are recognized as if they were present on the extended line of the non-latent image line 107.

In the branched latent image lines, when the total image line width of the branched latent image lines falls within the range of 90% to 110% of the image line width of the non-latent image line, the function and effect of the second embodiment can be obtained. This allowable range is a density range in which the branched latent image lines 108 can be prevented from being visually distinguished from the non-latent image line. To obtain this result, the region area must be 90% to 110% although it depends on the hue of ink. In printed pattern formed while setting the region area of the branched latent image lines 108 to 90% or less, the region area of the non-latent image lines, the region area of the branched latent image line 108 is smaller than that of the non-latent image line 107. and therefore the density in the region area of the branched latent image lines is lower. As a result, the image line of the non-latent image line 107 can be visually recognized. but, since the image lines of the branched latent image lines 108 themselves are invisible, under this condition, the latent image cannot be visually recognized.

When the upper limit of the region area of the non-latent image line 107 is set to 110%, and printed pattern is formed while setting the region area of the branched latent image lines 108 to more than 110%, the region area of the branched latent image lines 108 is larger than that of the non-latent image line 107. For this reason, the density of the branched latent image lines 108 is higher. Since the branched latent image lines 108 having a density higher than that of the non-latent image line 107 is visually recognized, the branched latent image lines 108 cannot be sufficiently invisible. To obtain the effect of the second embodiment, the following relationship is preferably satisfied at the time of image line design.

$$0.9*100a \leqq [\{100A-(100g+100g)*(n-1)\}/n] \leqq 1.1*100a \quad (1)$$

To design the branched latent image lines 102 branched from the non-latent image line 101, the interval from a base reference line 103 shown in FIG. 8 to a latent image curved line 109 serving as the center of the image line width 100*a* of the outermost branched latent image line, and the interval between adjacent latent image curved lines 109 of the two or more latent image curved lines 109 must be obtained. Let 100W' be the interval from the curved reference line 103 to the outermost latent image curved line 109 and 100W be the interval between the adjacent latent image curved lines 109. When the printed pattern having the authenticity discrimination pattern of the above-described second embodiment is visually observed, the non-latent image line 107 and branched latent image lines 108 must look like a continuous line. At this time, the positional relationship between the two image lines 108 of the branched latent image lines and the non-latent image line 107 is obtained by 100W' ={(n−1)(100S+100*g*+100*g*+100*a*)}/n and 100W=2*100W'/(n−1). Accordingly, printed pattern having a high authenticity discrimination effect can be obtained.

To make the latent image appear when the printed pattern of the second embodiment is irradiated with UV rays, the total image line peripheral length of the branched latent image lines 108 must be different from that of the non-latent image line 107 in the range of same length 100B in the branched latent image lines 108 and non-latent image line 107 in the direction of curved reference line, as shown in FIG. 8. More specifically, a total image line peripheral length 100×2 of the branched latent image lines 108 must be different from an image line peripheral length 100×1 of the non-latent image line 107. Where 100×1=100A+100A+100B+100B and 100×2=n* (100*a*+100*a*+100B+100B). More preferably, the total image line peripheral length 100×2 of the branched latent image line 108 is 1.4 times or more of the image line peripheral length 100×1 of the non-latent image line 107. That is, to obtain the effect of the second embodiment, a relationship given by $$1.4(2*100A+2*100B) \leqq n(2*100a+2*100B) \quad (2)$$

is preferably satisfied at the time of image line design.

As for the lightness of florescent light emission by color fluorescent ink, when the printed pattern is irradiated with UV rays, the intensity of fluorescent light emission sensible to an eye changes depending on the change in image line peripheral length per unit printing area of the printed pattern. Hence, it is indispensable to print the non-latent image line 107 and branched latent image lines 108 using color fluorescent ink.

Figure 9:
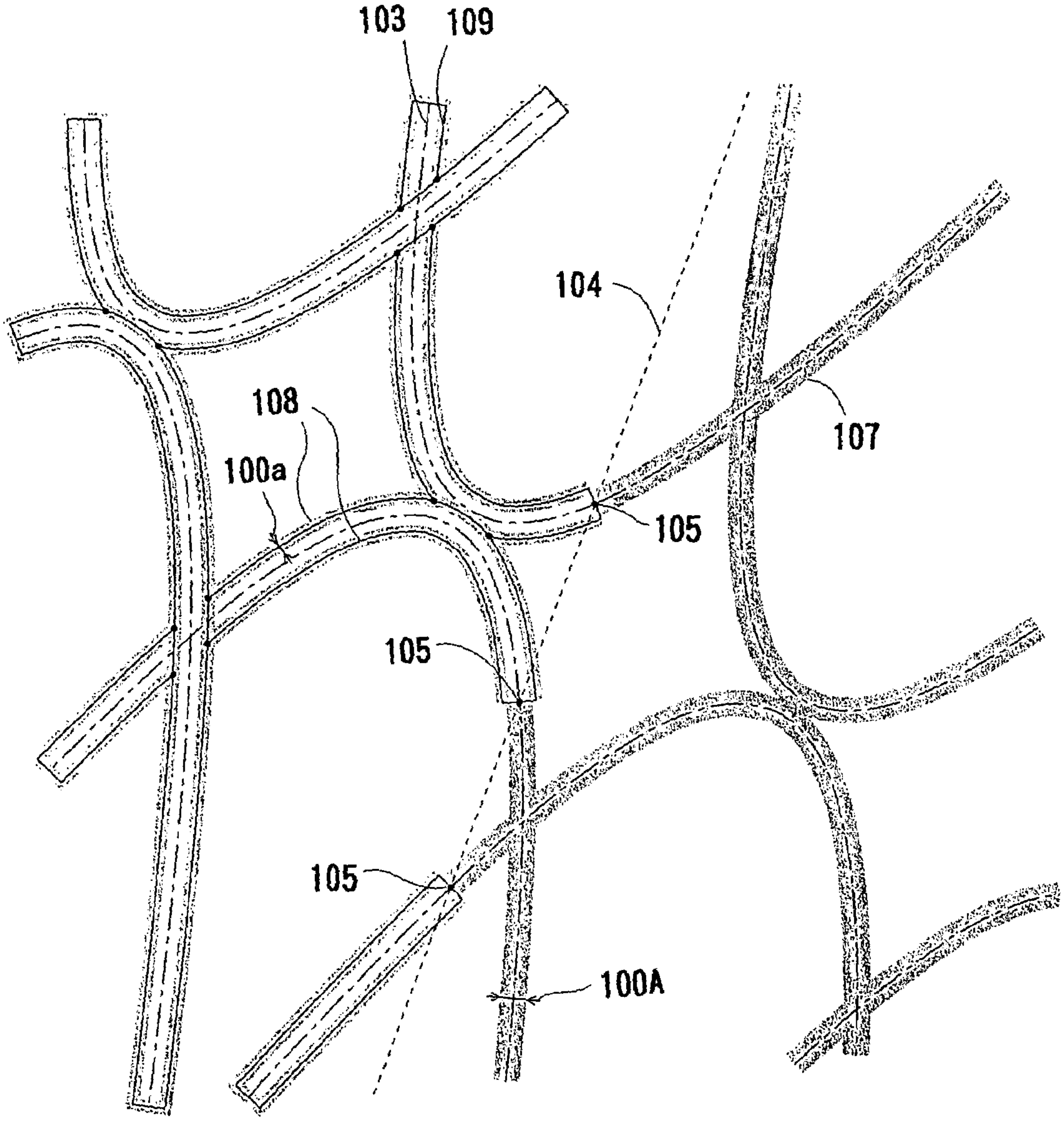
FIG. 9 is an explanatory view showing a state wherein one of areas where the image lines cross is deleted in the second embodiment.
Figure 10:
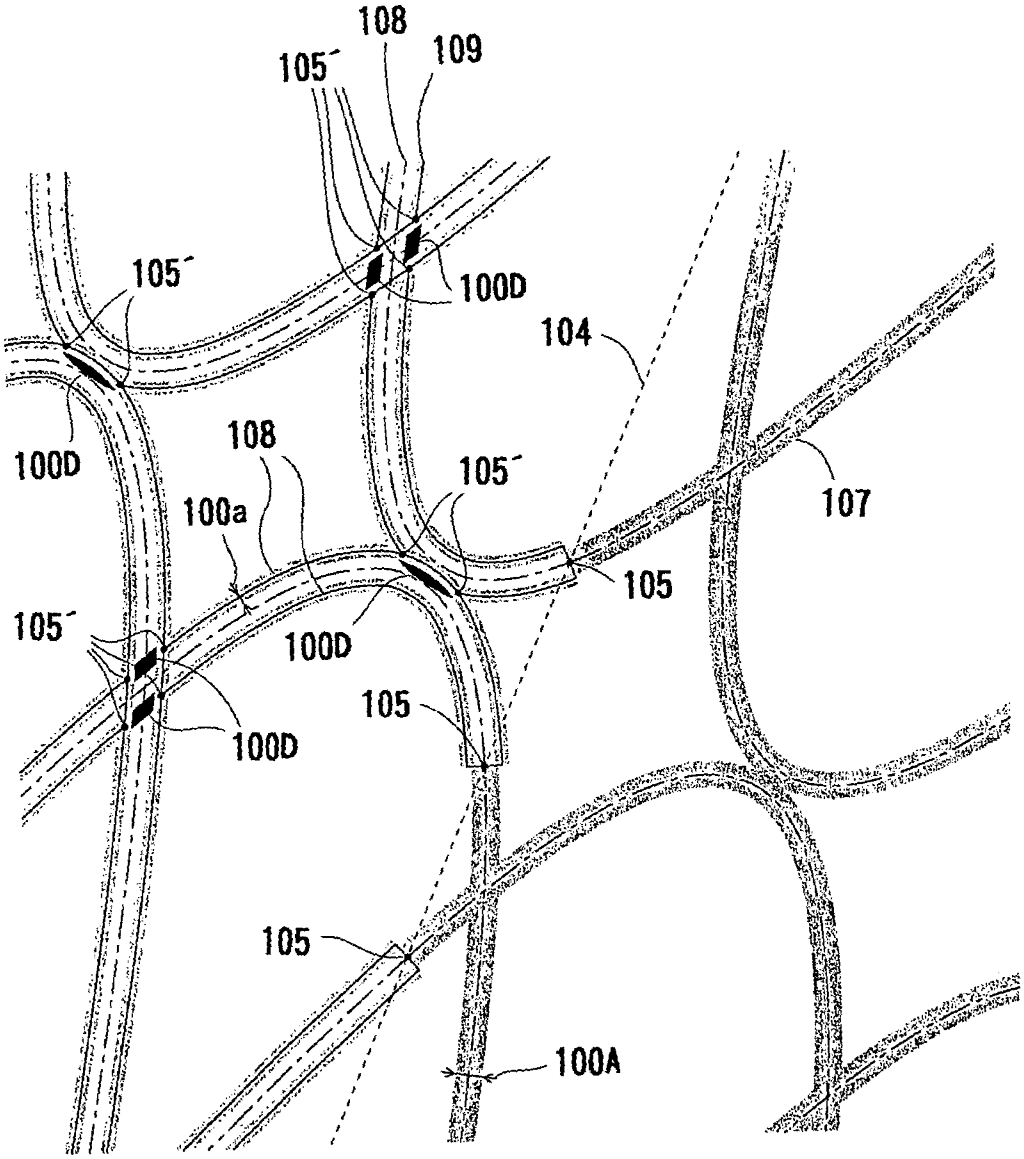
FIG. 10 is an explanatory view showing an area where the image lines cross in the second embodiment.

The overall authenticity discrimination pattern of the second embodiment will be observed. As shown in FIG. 9, when the image lines of the branched latent image lines in the pattern cross at a portion, it is corrected such that the crossing (superposition) of the image lines is eliminated. With this process, any increase in image line density that may occur at the crossing portion can be prevented. More specifically, when the authenticity discrimination pattern is formed, the branched latent image lines 108 sometimes completely cross each other, as shown in FIG. 10. In this case, at each intersection 105' where the image lines 108 cross, a region 100D of one of the image lines 108 is located inside the other image line 108 and deleted. With this process, when the printed pattern is irradiated with a specific wavelength such as UV rays, the image lines in the region 100D where the branched latent image lines cross cause fluorescent light emission at the same lightness without any difference in brightness of fluorescent light emission. Hence, the authenticity discrimination pattern formed from the branched latent image line appears as an image having a uniform brightness.

In the printed pattern printed under the above conditions, the branched latent image lines are visually recognized as if they were one image line and were located on the extended line of the non-latent image line. The authenticity discrimination pattern formed from the branched latent image lines can rarely be visually recognized.

When the printed pattern is irradiated with a predetermined wavelength such as UV rays, the difference in brightness of fluorescent light emission emission is generated between the branched latent image lines and the non-latent image line because the image line peripheral length per unit printing area is larger in the branched latent image lines than in the non-latent image line, and therefore the brightness of fluorescent light emission is higher in the branched latent image lines than in the non-latent image line. Hence, the authenticity discrimination pattern formed from the branched latent image lines appears.

When this printed pattern is formed by a line image structure having an anti-copy pattern, an anti-copy effect can be obtained.

An example using a lathe work pattern will be described below. A lathe work pattern is generally a pattern that is drawn on a mathematical function in accordance with a design. Guilloche machines include an apparatus which draws a pattern by the mechanical operation of gears, cams, and the like, and an apparatus which draws a pattern by a function on a two-dimensional coordinate system using a computer. An example using a commercially available CGS will be described below.

As described above, image line design at plate making must be executed in consideration of the expansion value (or contraction value) of image lines in printing, as described above. The image line width on the film master for plate making was set to 100 μm. Test image lines were offset-printed using commercially available wood free paper sheets as paper sheets and also commercially available offset ink (pink). After that, the image line width on the printed pattern was measured as 116 μm. Hence, the expansion value of the image lines in the direction of image line width is 16 μm as a whole. The expansion value (or contraction value) generated around the image lines in printing was turned out to be 8 μm.

Figure 11:
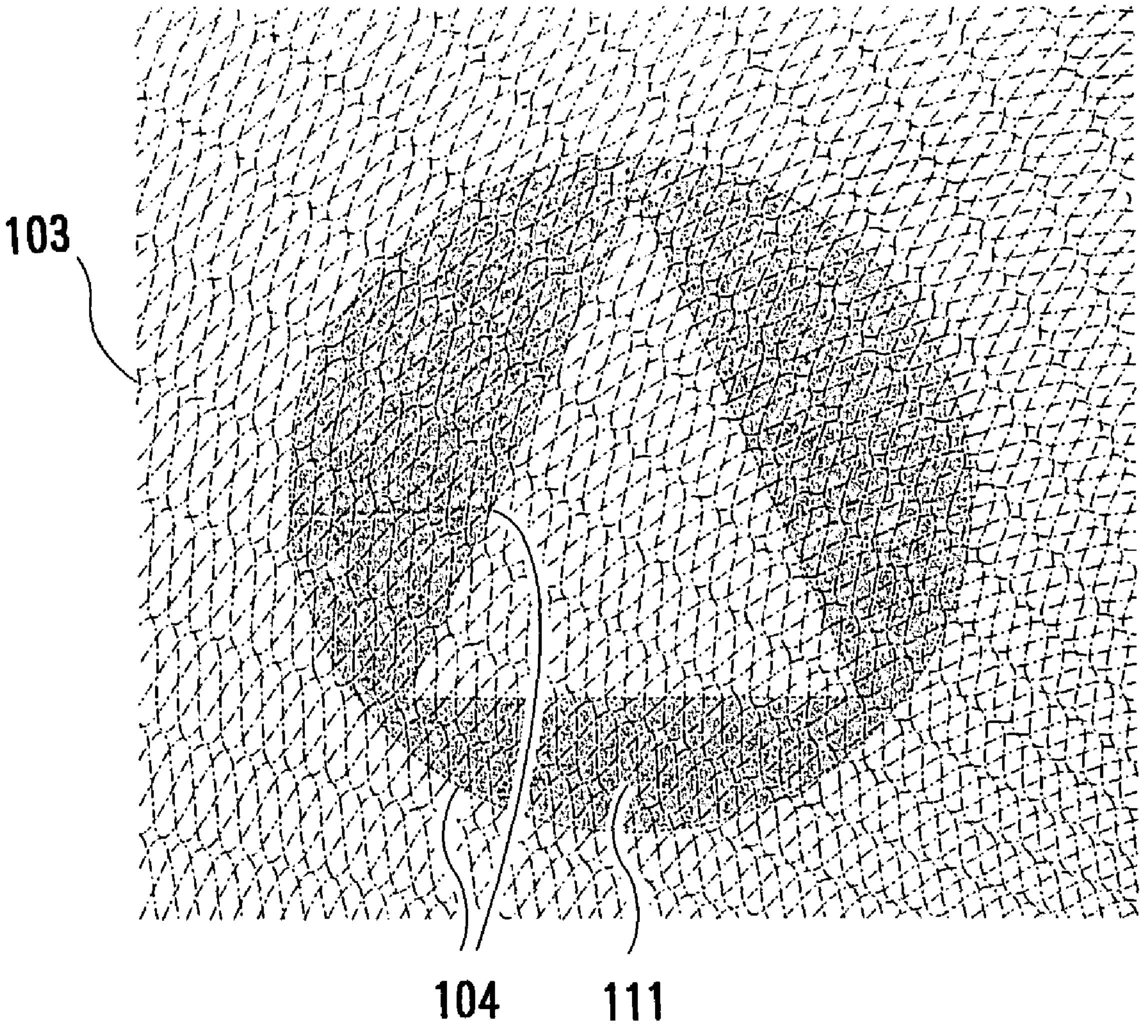
FIG. 11 is an explanatory view showing spline curves as the base of lathe work image lines in the second embodiment.

A printing plate to be used to obtain a lathe work pattern printed pattern in which the image line width of a non-latent image line was 116 μm was prepared in accordance with the second embodiment using the expansion value of 8 μm generated around the image lines obtained by test image lines. First, using a commercially available CGS, the curved reference lines 103 formed from spline curves that form the lathe work pattern image lines as shown in FIG. 11 were set on a two-dimensional coordinate system. A latent image pattern 111 was laid out on the curved reference lines 103 formed from spline curves. The latent image pattern may be any one of a character, number, and graphic pattern as long as it can clearly visually be identified when the printed pattern of the present invention is copied by a misguided person, and the printed pattern is irradiated with UV rays.

Figure 12:
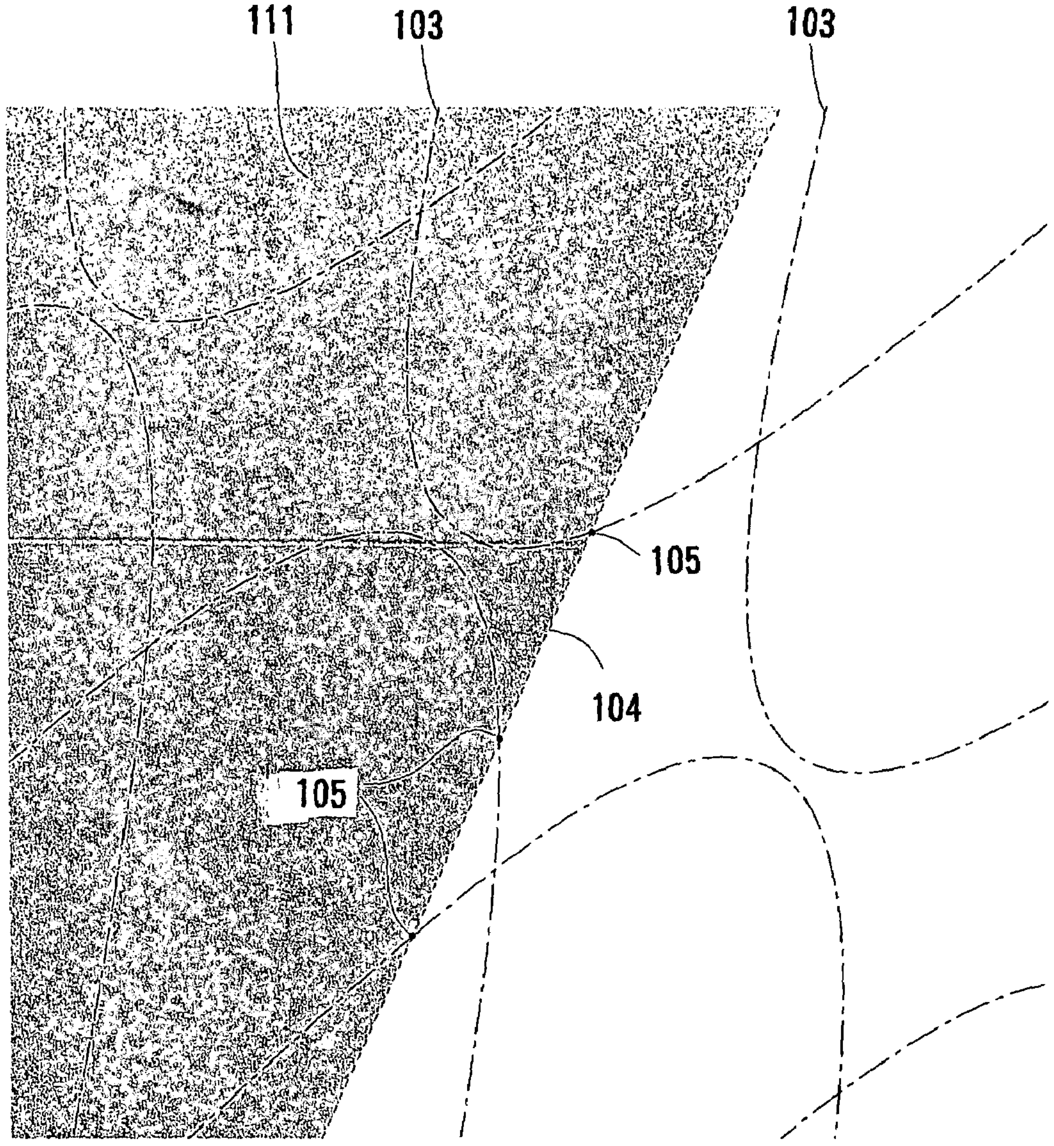
FIG. 12 is a partial enlarged view showing image lines on the two-dimensional data of an authenticity discrimination pattern in the second embodiment.

Non-latent image lines and branched latent image lines are formed at intersections 105 between the reference lines and the region of the latent image pattern 111 shown in FIG. 12 which partially enlarges a boundary portion 104 between the latent image pattern 111 and the reference lines 103 made of spline curves in FIG. 11.

It is assume that the image line width of the authenticity discrimination lathe work pattern to be formed is 116 μm, and the printed image line width against the reference line 103 is 116 μm. In this case, the image line width on the image line design is 100 μm because the expansion value of 16 μm in the entire printed image lines, which is grasped in the above-described test image lines, is subtracted from 116 μm.

In image line design of non-latent image lines, the image line width 100*a* of the branched latent image line and the positional relationship between the non-latent image line 107 and the branched latent image lines 108 in FIG. 8 must be defined. In addition, the interval 100W' from the reference line 103 to the latent image curved line 109 must be defined. These values are obtained from $$100a=\{100A-(100g+100g)(n-1)\}/n,$$

and $$100W'=\{(n-1)(100S+100g+100g+100a)\}/n$$

The number n of branched latent image lines and the interval 100S between the branched latent image line and the non-latent image line must be set in advance. For setting of the number n of branched latent image lines, since the latent image must be invisible, the width of one branched latent image line is preferably 60 μm or less such that it cannot be visually recognized. As described above, the image line width after printing is 116 μm. The number n of branched latent image lines was set to n=2 from 116 μm/60 μm. The interval 100S between the branched latent image line and the non-latent image line can be selected from the range of 25 to 60 μm in which the branched latent image line is not visually recognized. In this case, the interval 100S was set to 50 μm. When the set number n and interval 100S are substituted into equations.

Figure 13:
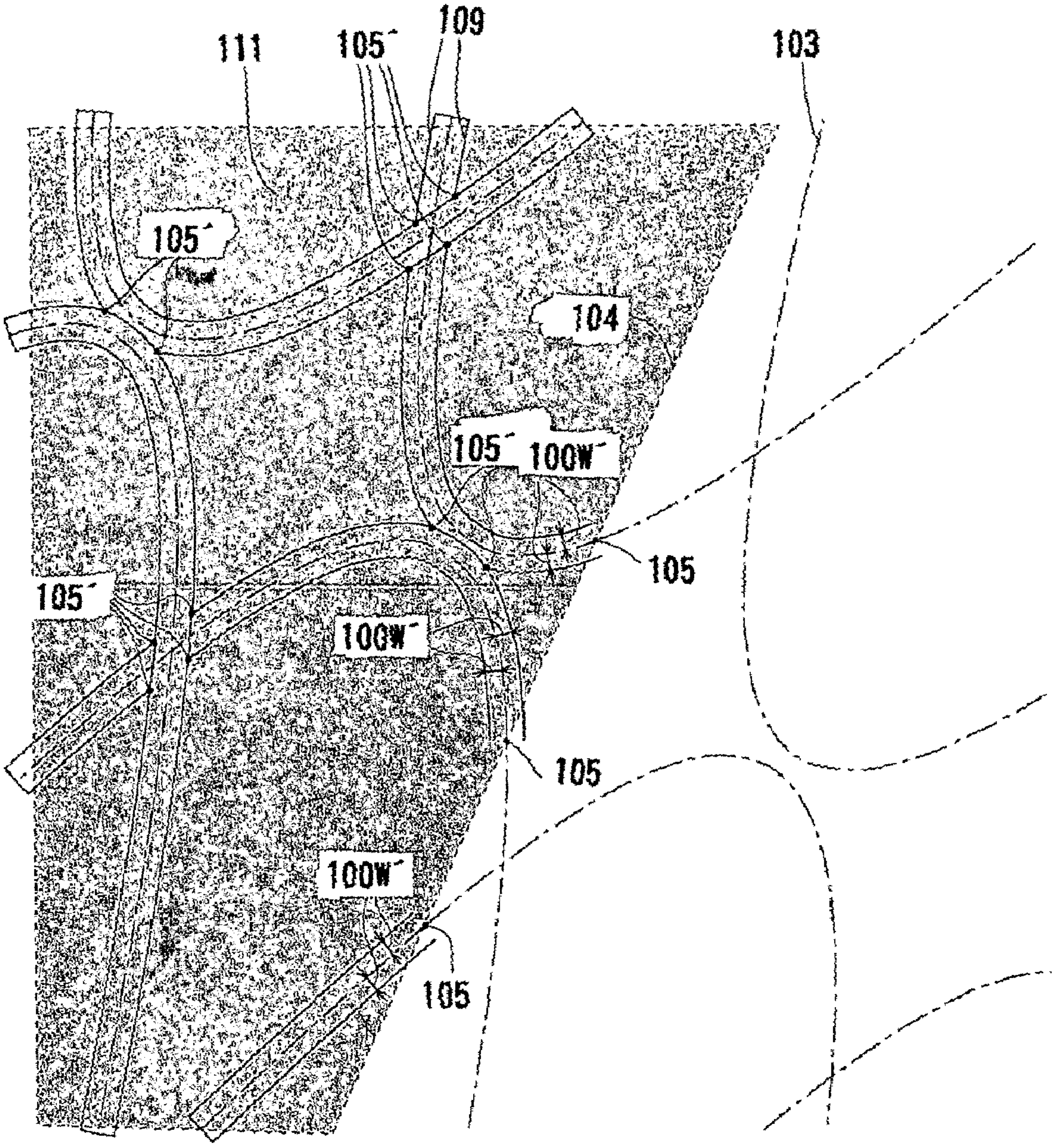
FIG. 13 is a partial enlarged view showing the authenticity discrimination pattern in the second embodiment.

From 100*a*={100−(8+8)(2−1)}/2, the image line width of one branched latent image line was 42 μm. From 100W'={(2−1)(50+8+8+42)}/2, the interval 100W' from the reference line 103 to the latent image curved line 109 was 54 μm. In the CGS, the latent image curved line 109 in the region 111 in FIG. 13, in which a latent image is to be formed, was set with reference to the intersection 105 of the reference line 103 formed from a spline curve on the boundary portion 104 of the latent image such that 54 μm was added to each side of the reference line 103, as indicated by 100W'.

In addition, the length of each image line, i.e., the length 100B of 100 μm is substituted into inequality (2), 1.4(2×100+2×100)≦2(2×42+2×100). Since 560≦568, it can be seen that the condition of inequality (2) is satisfied.

Next, for the authenticity discrimination pattern designed by the CGS, a film master plate making was generated using a commercially available laser plotter, and a printing plate was made using a commercially available positive type PS. Subsequently, 475 g of ink (DIC797: DAINIPPON INK AND CHEMICALS, INCORPORATED) were mixed with 25 g of fluorescent pigment (Lumikol 1000: Nippon Keikou Kagaku KK) to make a color fluorescent ink. Using the obtained printing plate and color fluorescent ink, the pattern was printed on commercially available wood free paper sheets by an offset press. The printed pattern shown in FIG. 14 was obtained.

Figure 14:
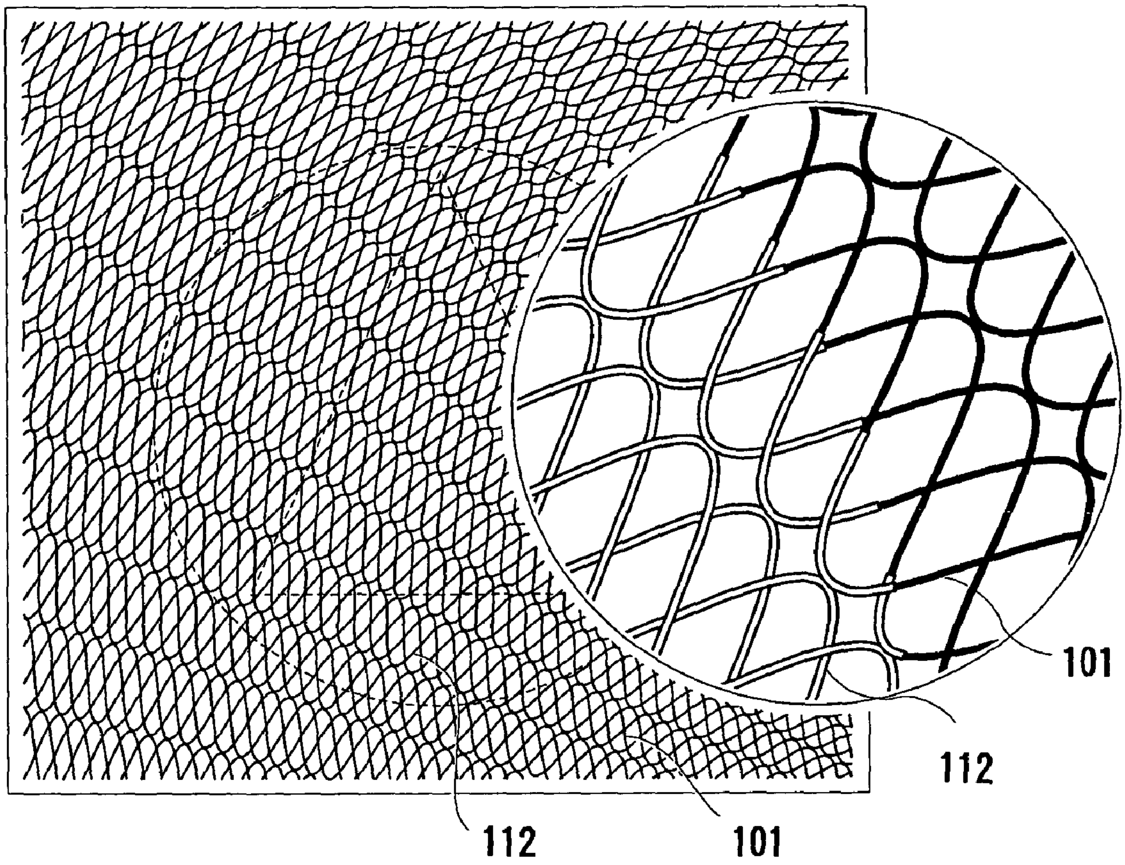
FIG. 14 shows an explanatory view and a partial enlarged view showing printed pattern according to the second embodiment.

The printed pattern shown in FIG. 14 is visually observed. An authenticity discrimination pattern 112 formed from branched latent image lines are two branched image lines. However, when examined visually, the authenticity discrimination pattern 112 is recognized as if it were one image line continued from the non-latent image line 101. Hence, the authenticity discrimination pattern formed from two branched image lines can rarely be visually recognized. Hence, in the authenticity discrimination pattern 112 formed from branched latent image lines, the observer cannot easily recognize the presence of the two branched image lines unless he/she tries to enlarge the printed image lines.

Figure 15:
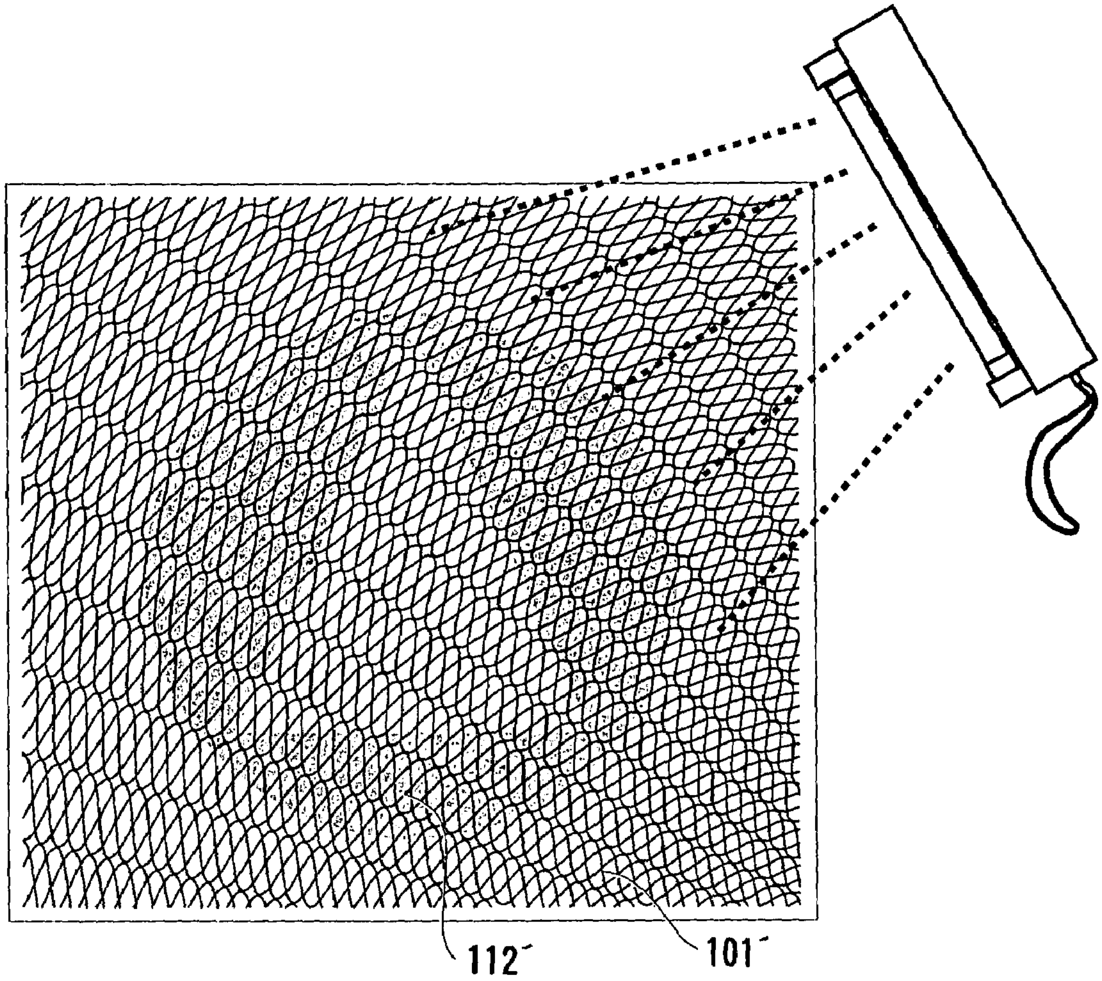
FIG. 15 is an explanatory view showing a state wherein the printed pattern according to the second embodiment is irradiated with UV rays.

FIG. 15 shows a state wherein the printed pattern is irradiated with UV rays having a wavelength of 365 nm using a UV irradiator. The brightness of fluorescent light emission is higher in an authenticity discrimination pattern 112' than in the non-latent image line 101'. Hence, a difference in the brightness of fluorescent light emission is generated between the authenticity discrimination pattern 112' and the non-latent image line 101'. The authenticity discrimination pattern formed from branched latent image lines appears and can be visually recognized.

As described above, according to this embodiment, the latent image is almost unnoticeable under ordinary visible light. When the printed pattern is irradiated with UV rays, the brightness of fluorescent light emission sensible to eyes changes depending on the change in line peripheral length per unit printing area of the printed pattern. Since the latent image lines area has higher line peripheral length per unit printing area, the intensity of the fluorescent light emission sensible to eyes would be higher than that of non-latent image line area. Accordingly, since the latent image can be recognized, the authenticity can easily be discriminated.

In addition, since printing can easily be performed by one-color printing, instead of multi-color printing, the cost can be reduced. No camouflage pattern need be overprinted. Printing needs to be executed only once using visible color fluorescent ink. For this reason, no colorless fluorescent ink need be overprinted on printed pattern having anti-copy image lines. The problem of fitting can be solved, and the cost of materials and the number of printing steps can be reduced. In addition, since the density management, image line thickening adjustment, and the like in printing are facilitated, the allowable range in printing can be widened.

Printed pattern having, in addition to a ground tint pattern or lathe work pattern, another kind of anti-forgery measure such as a moiré pattern on the same image lines may be formed. The authenticity discrimination effect does not decrease even when an emboss pattern (three-dimensional pattern) is formed after printing. Hence, this embodiment can be applied to securities including banknotes, stock certificates, and bonds, various kinds of certificates, and important documents which must not be forged or altered.

(3) Third Embodiment

The third embodiment of the present invention is described below.

Figure 16:
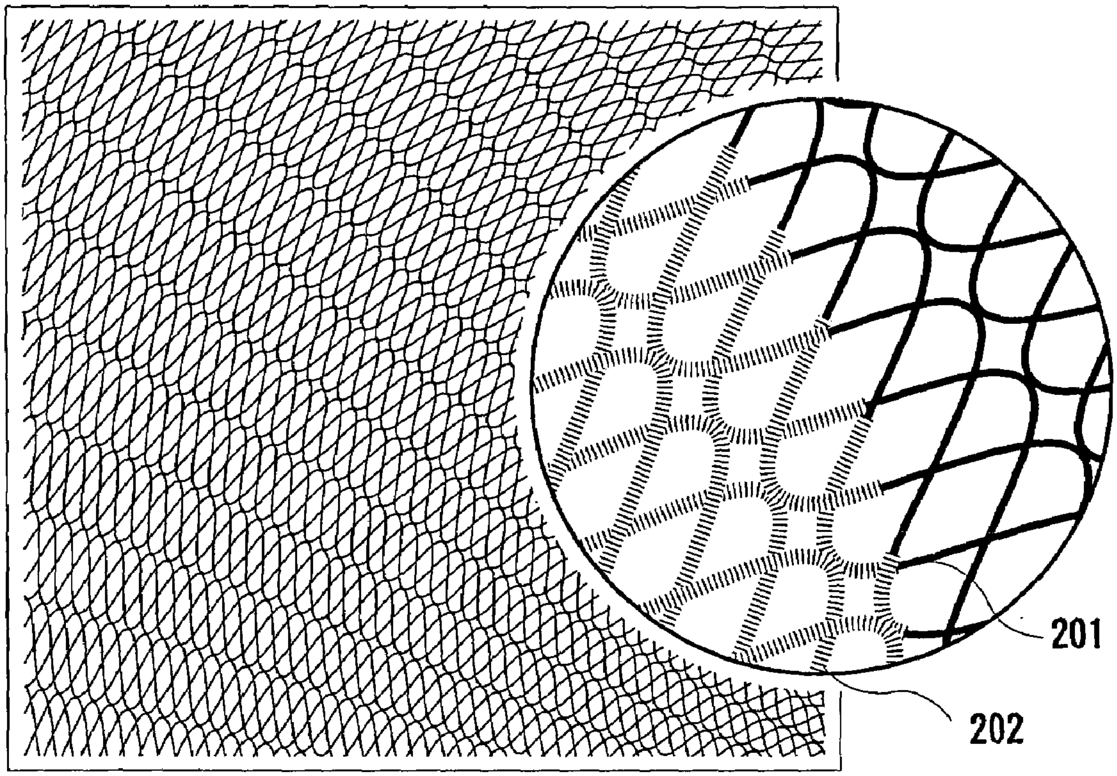
FIG. 16 is an explanatory view showing curved image lines of a portion having no latent image and curved image lines of a portion having a latent image in the third embodiment of the present invention.
Figure 17:
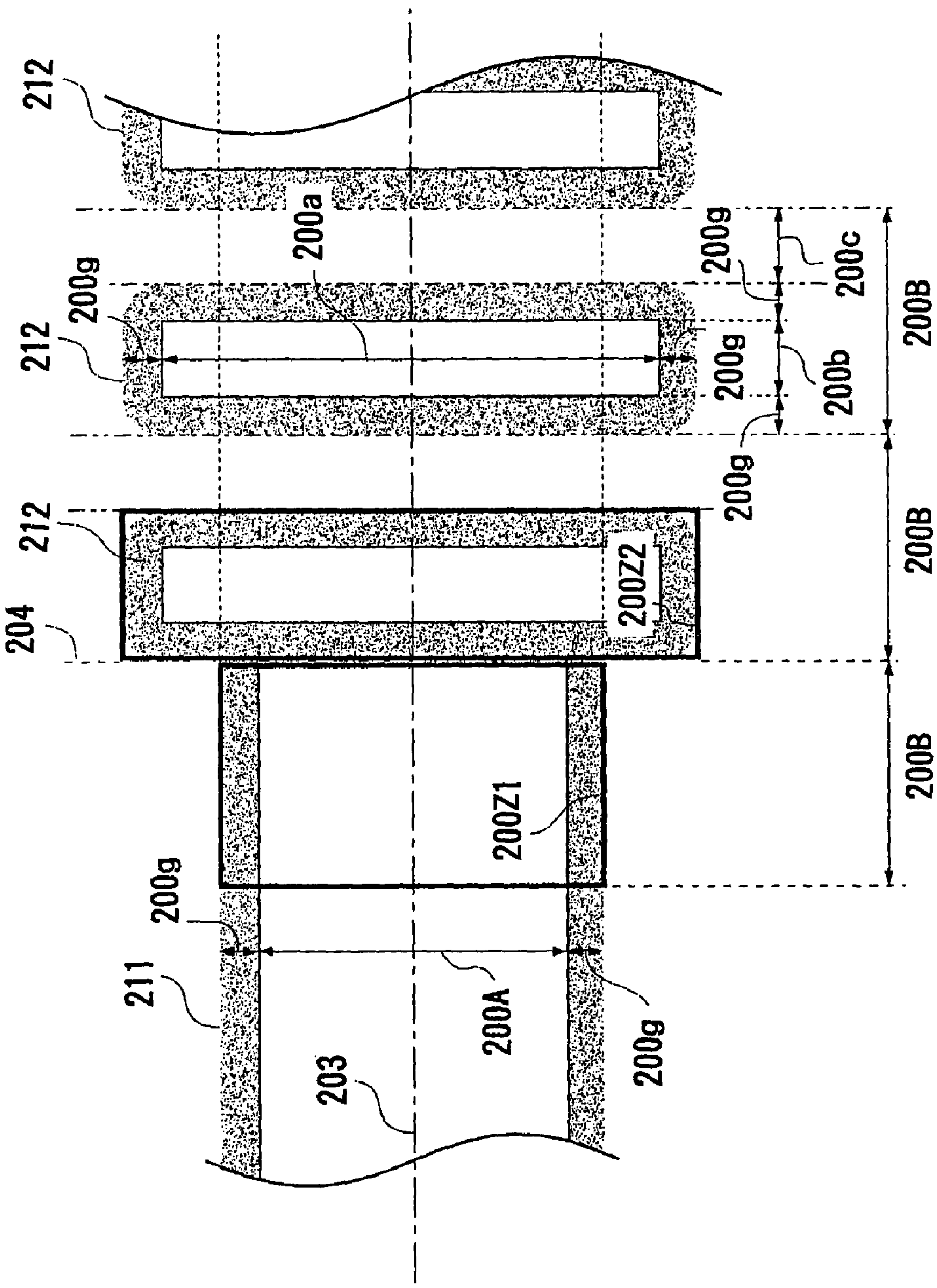
FIG. 17 is an enlarged view of the non-latent image line and branched latent image lines in the third embodiment.

The third embodiment is related to authenticity discriminable printed pattern in which a latent image that is formed in a curved collective pattern and is invisible under ordinary visible light becomes visible upon being irradiated with UV rays. The curved collective pattern is formed by curved line images 201 having no latent image (to be referred to as non-latent image lines hereinafter) and curved line images 202 having a latent image (to be referred to as divided latent image lines hereinafter), as shown in FIG. 16. The line image structure of the third embodiment is described in more detail with reference to FIG. 17 assuming that the curved line images are straight lines. FIG. 17 corresponds to an enlarged view of the boundary portion between the non-latent image line 201 and the divided latent image lines 202 shown in FIG. 16 where the non-latent image line and the divided latent image lines are in contact with each other.

In FIG. 17, let 200A be the image line width of a non-latent image line 211 in a direction perpendicular to a curved reference line 203, 200*a* be the image line width of an image line portion of the divided latent image line in a direction perpendicular to the curved reference line, 200*b* is the length of the image line portion of the divided latent image line in the direction of reference line, 200*c* be the length of the non-image line portion of the divided latent image line in the direction of reference line, 200B be the length of one period formed from one image line portion and one non-image line portion, which are solid in the divided latent image line, in the direction of curved reference line, and 200*g* is the expansion value (or contraction value) generated around the image line portion due to expansion of ink in printing.

In printing, the areas of the non-latent image line 211 and divided latent image line 212 are important factors. For the image line width in the direction perpendicular to the curved reference line and the image line width in the direction of curved reference line, which are to be influenced in printing, a change in expansion value (or contraction value) due to expansion of ink in printing is preferably taken into consideration. On printed pattern, the image line width of the non-latent image line 211 in the direction perpendicular to the curved reference line is given by 200A+200*g*+200*g*. The image line width of the divided latent image line 212 in the direction perpendicular to the curved reference line is given by 200*a*+200*g*+200*g*. The length of the divided latent image line 212 in the direction of curved reference line is given by 200*b*+200*g*+200*g*.

Hence, in the length 200B of one period in the direction of curved reference line, a region area 200Z1 of the non-latent image line 211 and a region area 200Z2 of the divided latent image line 212 must almost equal. More specifically, the image line width 200A of the non-latent image line 211 in the direction perpendicular to the curved reference line is given by 200A +2*200*g*, the image line width 200*a* of the divided latent image line 212 in the direction perpendicular to the curved reference line is given by 200*a*+2*200*g*, and the length of the divided latent image line 212 in the direction of reference line is given by 200*b*+2*200*g*.

To prevent the latent image from being visually noticeable under ordinary visible light, the relationship between the region area 200Z1 of the non-latent image line 211 for which the expansion value generated around the image line due to expansion of ink in printing is taken into consideration and the region area 200Z2 of the image line portion of the divided latent image line 212 for which the expansion value due to expansion of ink in printing is taken into consideration in the length 200B of one period in the direction of curved reference line is important. The region area 200Z1 must almost equal the region area 200Z2. At the time of line image design, the image line width 200A of the non-latent image line 211 in the direction perpendicular to the curved line and the image line width 200*a* of the divided latent image line 212 in the direction perpendicular to the base curved line preferably satisfy the relationship given by $$200a=200B(200A+200g+200g)/(200b+200g+200g)-(200g+200g) \quad (3)$$

In addition, the region area 200Z2 falls within the range of 90% to 110% of the region area 200Z1, the image line can be visually unnoticeable under ordinary visible light. This range is a density range in which the latent image formed from the divided latent image lines 212 in printing can be prevented from being visually recognized. Although the the preferred range is 90% to 110% the range may vary depending on the hue of ink.

In printed pattern formed while setting the region area of the divided latent image line 212 to 90% or less, the region area is smaller than that of the non-latent image line 211. Hence, the density decreases as moving from the non-latent image to the divided latent image. In such case, the image line of the non-latent image line 211 can be visually recognized. while the image line itself of the divided latent image line 212 cannot be visually recognized. Hence, the latent image is insufficiently invisible.

In printed pattern formed while setting the region area of the divided latent image line 212 to 110% or more, the region area of the divided latent image line 212 is larger than that of the non-latent image line 211. For this reason, the density increases. as moving from the non-latent image to the divided latent image. Since the divided latent image line 212 has a density higher than that of the non-latent image line 211, the divided latent image line 212 can be visually recognized. The divided latent image line 212 cannot be sufficiently invisible, and the effect of the third embodiment cannot be obtained. That is, to cause the image line structure to have the effect of the third embodiment, the following relationship is preferably satisfied at the time of image line design.

$$0.9*200B(200A+2*200g) \leqq (200a+2*200g)\times(200b+2*200g) \leqq 1.1*200B(200A+2*200g) \quad (4)$$

To make the latent image appear when the printed pattern is irradiated with UV rays, the relationship between a peripheral length of the region area of the non-latent image line 211 for which the expansion value generated around the image line in printing is taken into consideration and a peripheral length of the region area of the image line portion of the divided latent image line 212 for which the expansion value generated in printing is taken into consideration in the length 200B of one period in the direction of curved reference line is important, as shown in FIG. 17. The peripheral length of the area 200Z2 must be different from that of the area 200Z1. More preferably, the peripheral length of the region area 200Z2 is 1.1 times or more of that of the region area 200Z1. That is, to obtain the effect of the third embodiment, the following relationship is preferably satisfied at the time of line image design $$1.1\{2*200B+2(200A+2*200g)\} \leqq (2*200b+4*200g)+(2*200a+4*200g) \quad (5)$$

A length 200*c* of the non-image line portion of the divided latent image line is set within the range of 25 to 60 μm in which the divided latent image line cannot be visually recognized. Accordingly, the divided latent image lines 212 are visually recognized as if they were one continuous line, and are recognized as if they were on the extended line of the non-latent image line 211.

As for the brightness of florescent light emission by color fluorescent ink, when the printed pattern is irradiated with UV rays, the intensity of fluorescent light emission sensible to an eye changes depending on the change in image line peripheral length per unit printing area of the printed pattern. Hence, it is indispensable to print the non-latent image line 211 and divided latent image lines 212 using color fluorescent ink.

Figure 18:
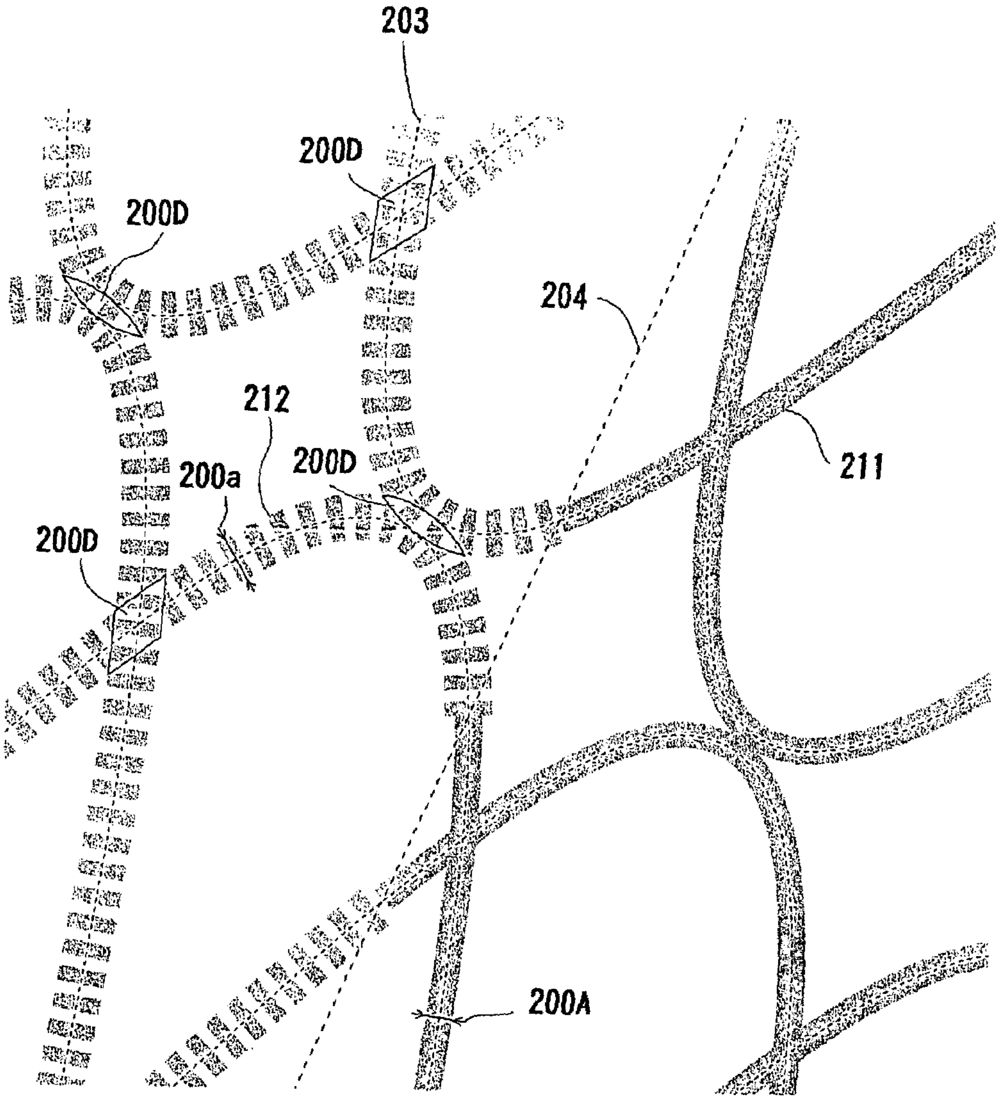
FIG. 18 is an explanatory view showing a state wherein one of areas where the image lines cross is deleted in the third embodiment.

As shown in FIG. 18, in a region 200D where the image line portions of the divided latent image lines 212 cross, one of the image line portions that overlap at the crossing section 212 is deleted. It is assumed that, when the overall authenticity discrimination pattern is observed, the region 200D where the curved image line portions cross is apparently present. In fact, the image line portions are corrected such that the crossing (superposition) of the image line portions of the divided latent image lines 212 is eliminated. With this process, any increase in density of the image line portion, which may occur at the crossing portion, can be prevented.

Figure 19:
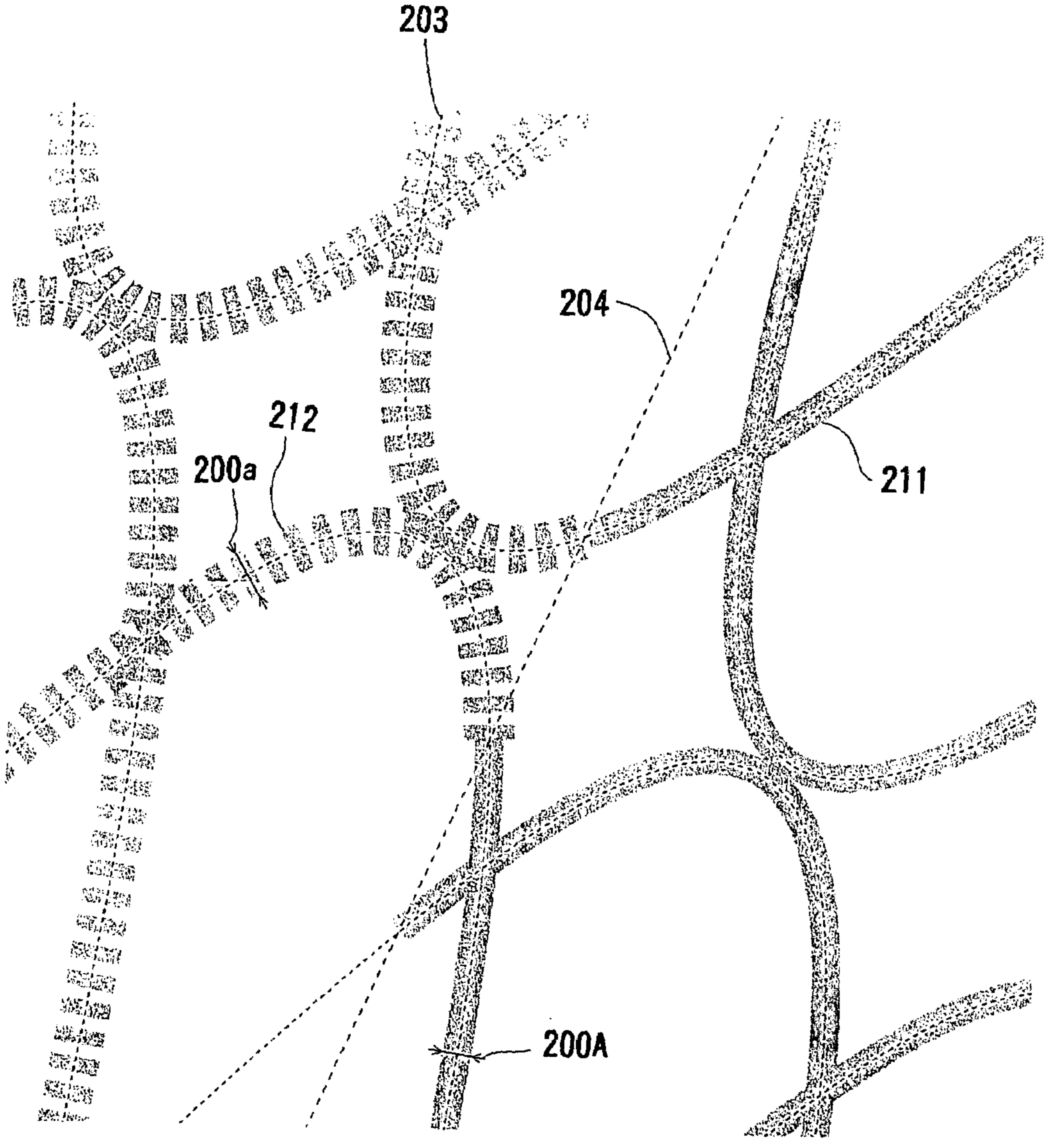
FIG. 19 is an explanatory view showing an area where the image lines cross in the third embodiment.

More specifically, when the authenticity discrimination pattern made of the divided latent image lines 212 is formed, the image line portions of the divided latent image lines 212 sometimes completely cross each other, as shown in FIG. 19. In this case, in each region 200D where two image line portions cross, one image line portion at the crossing section is deleted.

With this process, when the printed pattern is irradiated with a specific wavelength such as UV rays, the image line portions in the region 200D where the image line portions of the divided latent image lines 212 cross cause fluorescent light emission at the same lightness without any difference in brightness of fluorescent light emission. Hence, the authenticity discrimination pattern formed from the divided latent image lines appears as an image having a uniform brightness.

In the printed pattern printed under the above conditions, the image line portions of the divided latent image lines are visually recognized as if they were one continuous line and were located on the extended line of the non-latent image line. The authenticity discrimination pattern formed from the image line portions of the divided latent image lines cannot easily be visually recognized.

When the printed pattern is irradiated with a predetermined wavelength such as UV rays, the difference in the brightness of fluorescent light emission is generated between the image line portions of the divided latent image lines and the solid line of the non-latent image line because the image line peripheral length corresponding to one period is larger in the image line portions of the divided latent image lines than in the solid line of the non-latent image line, and therefore the brightness of fluorescent light emission is higher in the image line portions of the divided latent image lines than in the solid line of the non-latent image line. Hence, the authenticity discrimination pattern formed from the image line portions of the divided latent image lines becomes visible.

When the printed pattern according to the third embodiment is formed by a line image structure having an anti-copy pattern, an anti-copy effect can be obtained.

For the third embodiment, an example in which a lathe work pattern was formed using a commercially available CGS will be further described.

In the third embodiment, as described above, to design image lines at plate making in consideration of the expansion value (or contraction value) of image lines in printing, the expansion value (or contraction value) was examined in advance by test image lines.

The image line width on the film master for plate making was set to 100 μm. Test image lines were offset-printed using commercially available wood-free paper sheets and commercially available offset ink (light pink). The image line width on the printed pattern was measured as 116 μm. Hence, the expansion value of the image lines in the direction of reference line is 16 μm as a whole. The expansion value (or contraction value) generated around the image lines in printing turned out to be 8 μm.

Figure 20:
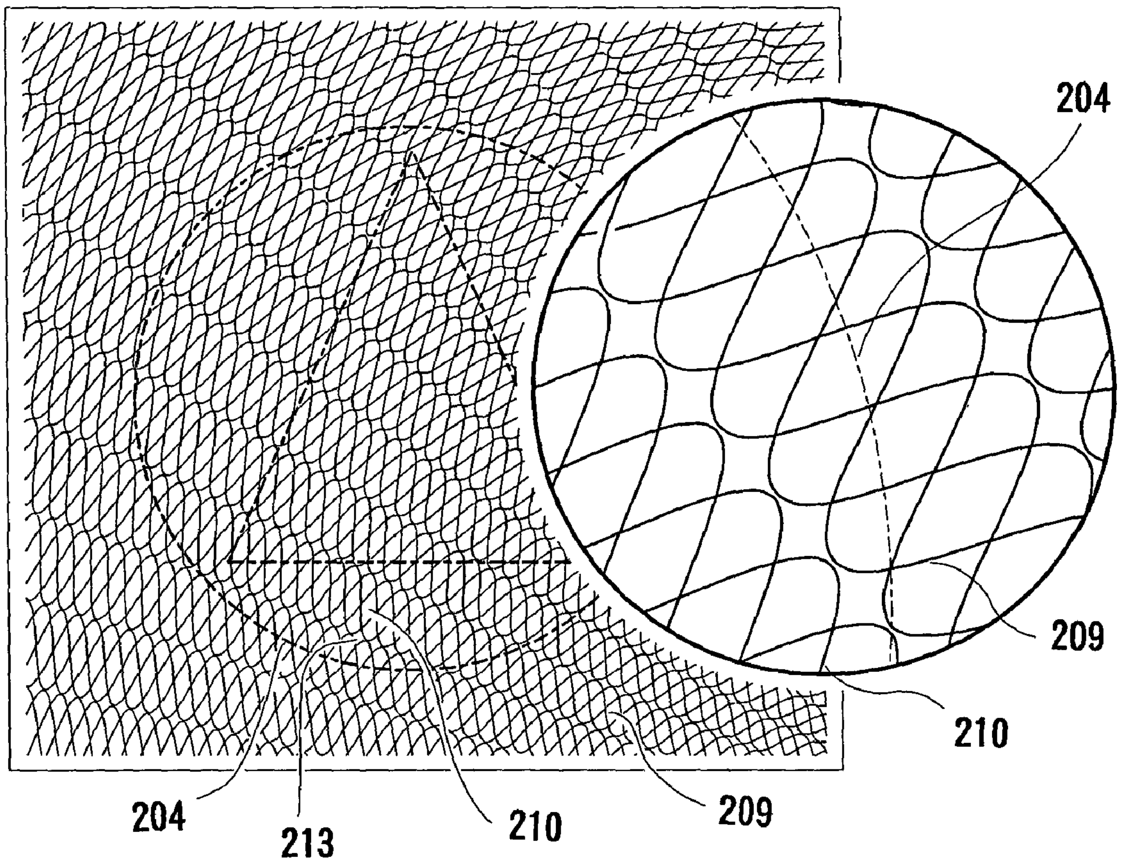
FIG. 20 shows an explanatory view and a partial enlarged view showing image lines on the two-dimensional data of an authenticity discrimination pattern in the third embodiment.

A printing plate to be used to obtain a plurality of lathe work pattern printed pattern in which the printed image line width of the solid line of a non-latent image line in the direction perpendicular to the curved reference line was 116 μm was prepared using the obtained expansion value of 8 μm. Using a CGS, curved reference lines 209 formed from spline curves that form the pattern made of a plurality of image lines as shown in FIG. 20 were drawn. The curved reference line 209 is a moderate wavy line. The curved reference lines 209 were set on a two-dimensional coordinate system. An authenticity discrimination pattern 210 formed from divided latent image lines was laid out on the curved reference lines 209. The authenticity discrimination pattern 210 formed from the image line portions of the divided latent image lines is a graphic pattern that is usually invisible. The authenticity discrimination pattern 210 may be any one of a character, number, and graphic pattern as long as it can clearly visually be identified when the printed pattern is copied by a misguided person, and the printed pattern is irradiated with UV rays.

The boundary portion between the non-latent image line and the divided latent image line is formed from the curved reference line 209 made of a spline curve and a line image 213 of the divided latent image line, which is surrounded by a contour line 204 of the authenticity discrimination pattern 210, as shown in FIG. 20. The numerical values of the image line width and periodic broken line are substituted into the spline curves.

The printed image line width of the non-latent image line 211 in the direction perpendicular to the curved reference line 203 in FIG. 17 was set to 116 μm. The image line width

200A on the image line design was set to 100 μm by subtracting, from 116 μm, the expansion value of (8+8) μm of the image line in the direction of image line width, which was grasped in the above-described test image lines.

Next, the image line was set. The length (200*b*+200*g*+200*g*) was set to 50 μm. The length 200*b* was set to 34 μm by subtracting the expansion value, 16 μm, of the image line width in the direction of reference line, which was grasped by test image lines. The length 200*c* of the non-image line portion of the divided latent image line in the direction of reference line can be selected from the range of 25 to 60 μm wherein the divided latent image line is not visually recognized. The length 200*c* was set to 50 μm. The length 200B of one period of the divided latent image line in the direction of curved reference line was 34+16+50=100 μm. The set lengths 200*b* and 200B were substituted into the above equation, 200*a*=100(100+8+8)/(34+8+8)−(8+8). As the image line width 200*a* of the image line portion of the divided latent image line in the direction perpendicular to the curved reference line, a value of 216 μm was obtained.

Figure 21:
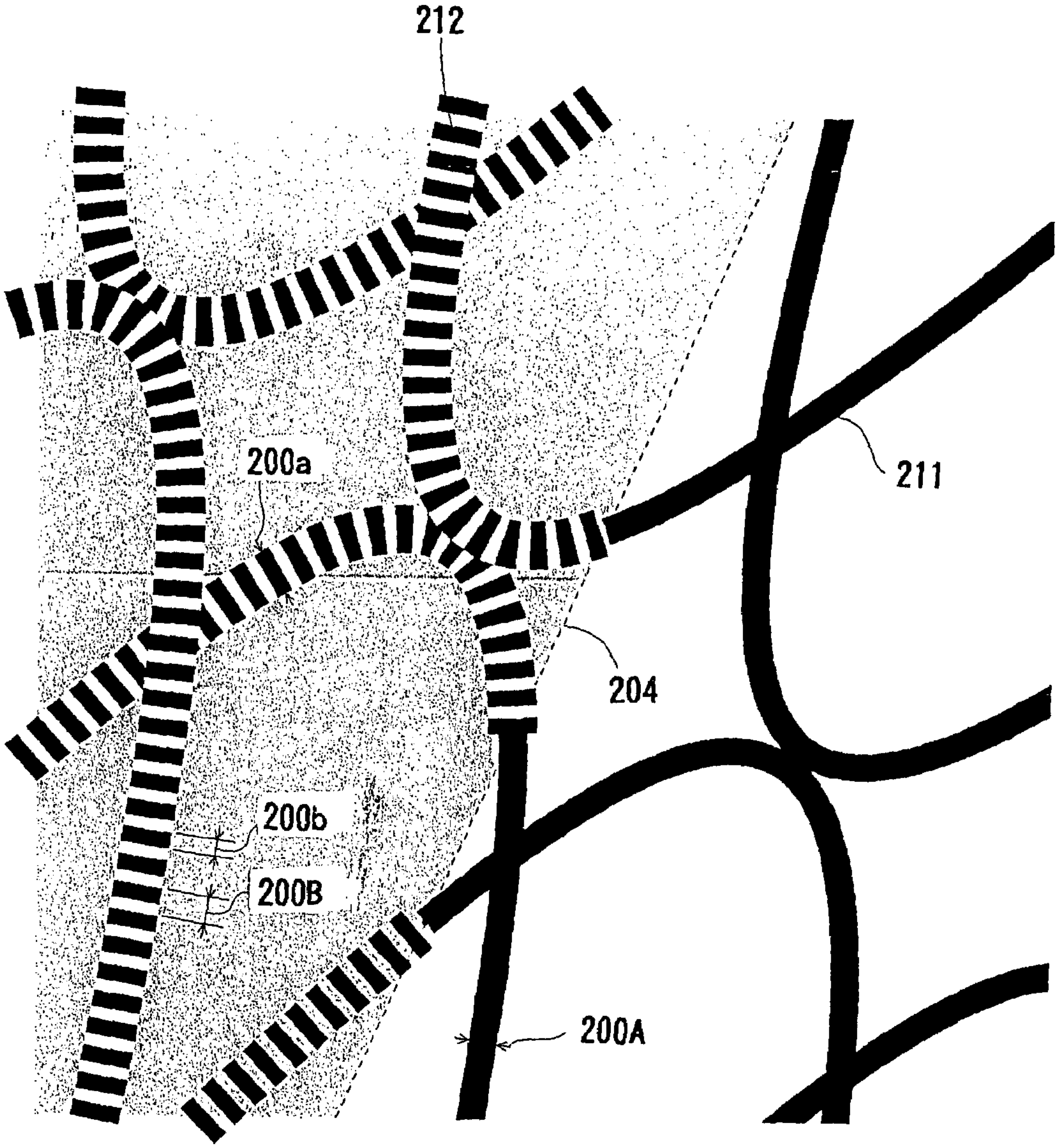
FIG. 21 is an explanatory view showing the image line width on the two-dimensional data of the authenticity discrimination pattern in the third embodiment.

In accordance with the numerical values obtained by calculations, the image line width 200A of the solid line of the non-latent image line in the direction perpendicular to the curved reference line was set to 100 μm, the image line width 200*a* of the image line portion of the divided latent image line in the direction perpendicular to the curved reference line was set to 216 μm, the length 200*b* of the image line portion of the divided latent image line in the direction of curved reference line was set to 34 μm, and the length 200B of one period of the divided latent image line in the direction of curved reference line was set to 100 μm on two-dimensional data, as shown in FIG. 21.

When the length of each image line is substituted into inequality (5), $1.1\{2\times50+2(100+2\times8)\}\leqq(2\times34+4\times8)+(2\times216+4\times8)$, i.e., $365.2\leqq564$. Hence, the condition is satisfied.

A film master for making a plate was generated using a commercially available laser plotter, and a printing plate was made using a commercially available positive type PS. Subsequently, 475 g of ink (DIC797: DAINIPPON INK AND CHEMICALS, INCORPORATED) were mixed with 25 g of fluorescent pigment (Lumikol 1000: Nippon Keikou Kagaku KK) to prepare color fluorescent ink. Using the obtained printing plate and color fluorescent ink, the pattern was printed on commercially available wood-free paper sheets by an offset press. The printed pattern shown in FIG. 22 was obtained.

Figure 22:
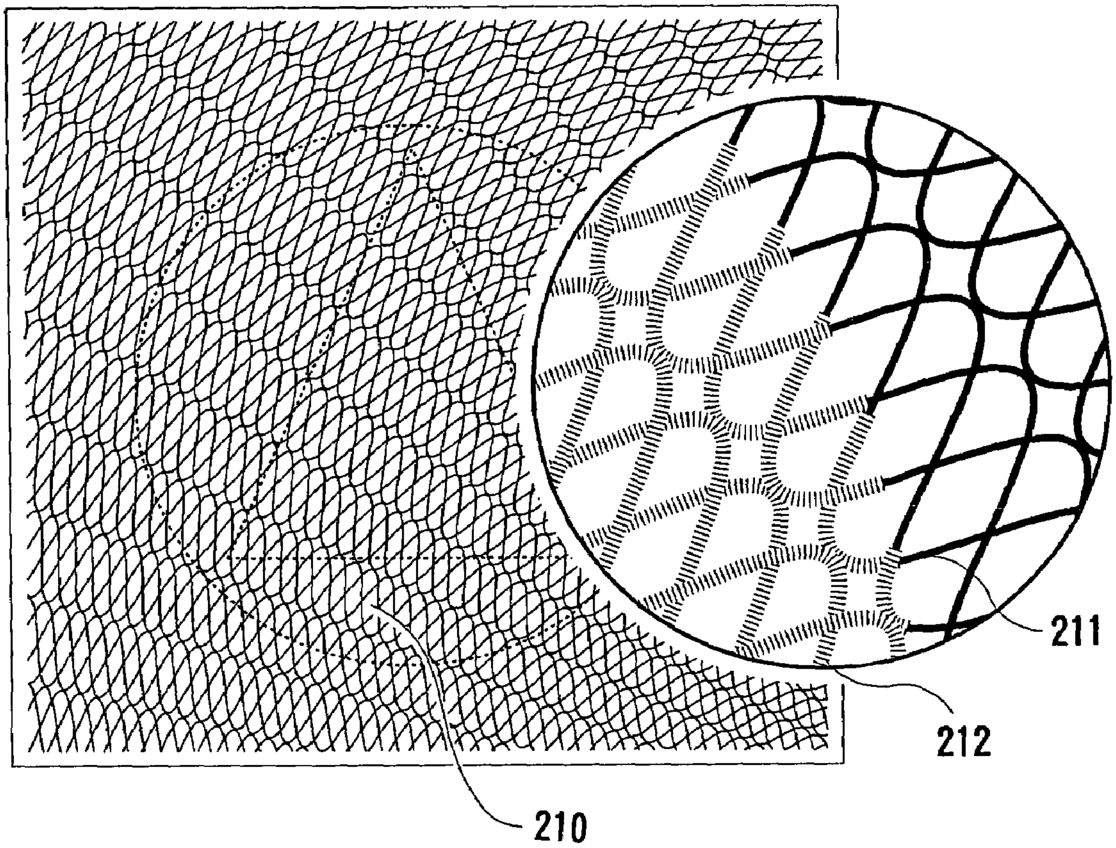
FIG. 22 shows an explanatory view and a partial enlarged view showing printed pattern according to the third embodiment.

The printed pattern shown in FIG. 22 is visually observed. The authenticity discrimination pattern 210 as divided latent image lines are formed from periodic broken lines. However, when examined visually, the authenticity discrimination pattern 210 is recognized as if it were the non-latent image line 211. Hence, the authenticity discrimination pattern formed from the divided latent image lines cannot be visually recognized. Hence, the observer cannot recognize the presence of the image lines formed from the periodic broken lines unless he/she tries to enlarge the printed image lines.

Figure 23:
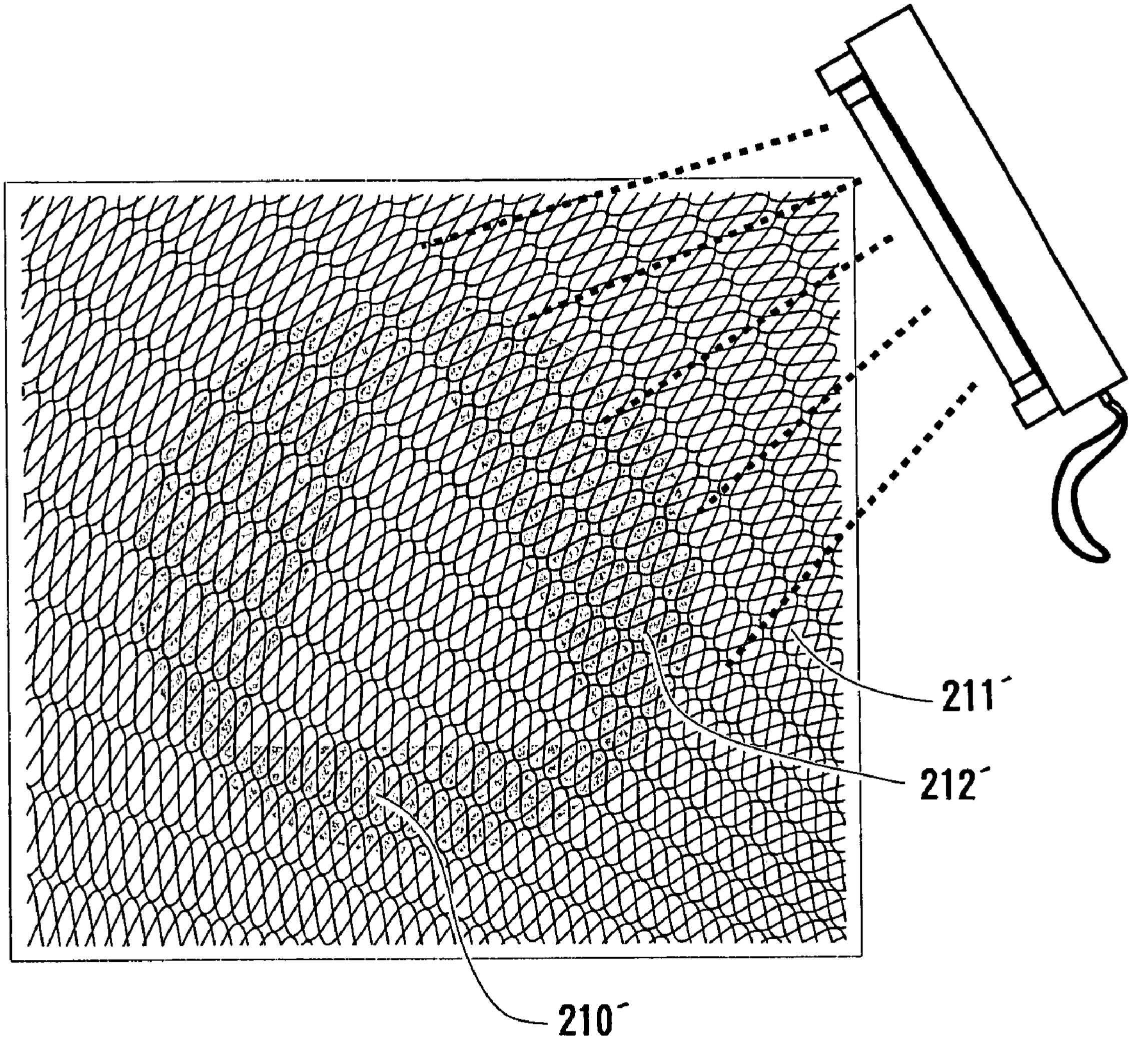
FIG. 23 is an explanatory view showing a state wherein the printed pattern according to the third embodiment is irradiated with UV rays.

FIG. 23 shows a state wherein the printed pattern shown in FIG. 22 is irradiated with UV rays having a wavelength of 365 nm using a UV irradiator. The brightness of fluorescent light emission is higher in an authenticity discrimination pattern 210' than in an on-latent image line 211'. Hence, a difference in the brightness of fluorescent light emission is generated between the authenticity discrimination pattern 210' formed from the divided latent image lines and the non-latent image line 211'.The authenticity discrimination pattern 210' formed from the divided latent image lines appears and can be visually recognized.

Experiments were conducted to obtain an appropriate ratio of the image line peripheral length of a portion that corresponds to one period formed from the image line portion and non-image line portion of a divided latent image line to the image line peripheral length of a portion of the solid line of the non-latent image line, which corresponds to the same length as that of the period of the periodic broken line in the direction of curved reference line. FIG. 24 shows the result obtained from the experiments. For evaluation, ○ is “effective”, □is “effective to some extent”, and x is “ineffective”.

As shown in FIG. 24, when the ratio of the image line peripheral length of the portion that corresponds to one period of the divided latent image line to the image line peripheral length of the portion of the solid line of the non-latent image line, which corresponds to the same length as that of the period of the periodic broken line in the direction of curved reference line is set to 1.1 or more, the image can be recognized upon exposure to UV rays.

As described above, according to this embodiment, the latent image is almost unnoticeable under ordinary visible light. When the printed pattern is irradiated with UV rays, the brightness of fluorescent light emission sensible to eyes changes depending on the change in line peripheral length per unit printing area of the printed pattern. Since the latent image line area has higher line peripheral length per unit printing area, the intensity of the fluorescent light emission sensible to eyes would be higher than that of non-latent image line area. Accordingly, since the latent image can be recognized, the authenticity can easily be discriminated.

In addition, since printing can easily be performed by one-color printing, instead of multi-color printing,the cost can be reduced. No camouflage pattern need be overprinted. Printing needs to be executed only once using a visible color fluorescent ink. For this reason, no colorless fluorescent ink need be overprinted on printed pattern having anti-copy image lines. The problem of fitting can be solved, and the cost of materials and the number of printing steps can be reduced. In addition, since the density management, image line thickening adjustment, and the like in printing are facilitated, the allowable range in printing can be widened.

Printed pattern having, in addition to a ground tint pattern or lathe work pattern, another kind of anti-forgery measure such as a moiré pattern on the same image lines may be formed. The authenticity discrimination effect does not decrease even when an emboss pattern (three-dimensional pattern) is formed after printing. Hence, this embodiment can be applied to securities including banknotes, stock certificates, and bonds, various kinds of certificates, and important documents which must not be forged or altered.

(4) Fourth Embodiment

The fourth embodiment of the present invention is described below.

In the fourth embodiment, an authenticity discrimination pattern will be described, which is formed from broken lines obtained by equidistantly branching an image line having a latent image into three parts in the longitudinal direction of reference line. The number of branches is not limited to three and can be n ($n\geqq2$) in the longitudinal direction of reference line.

Figure 25:
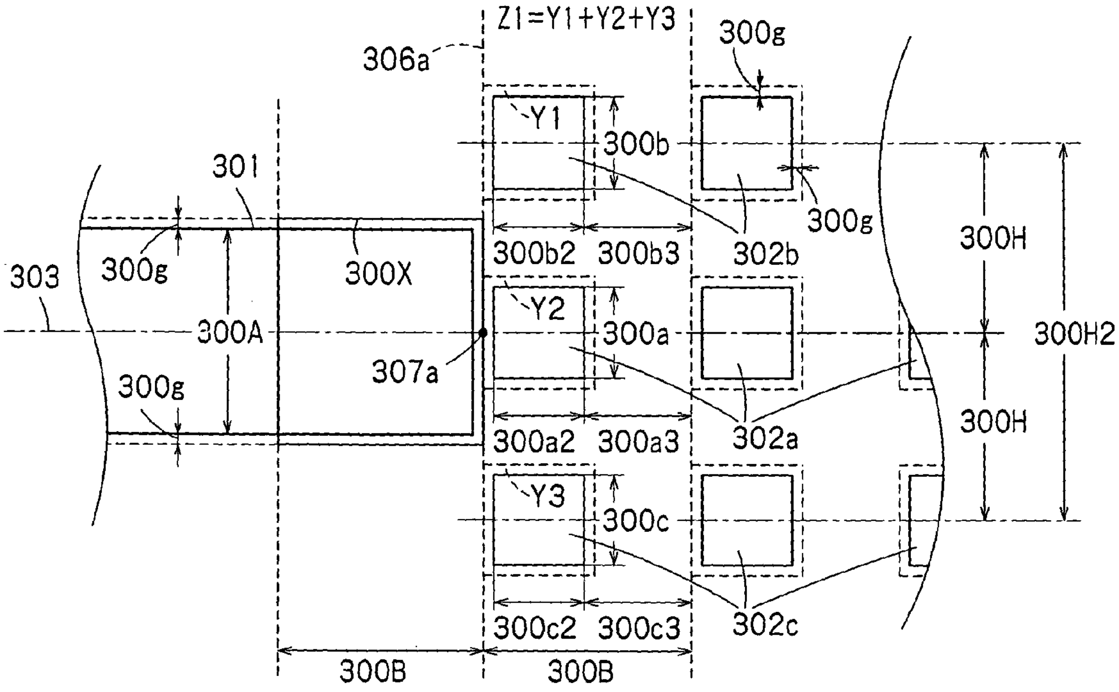
FIG. 25 is an enlarged view showing image lines of a portion having no latent image and periodic broken lines in the fourth embodiment of the present invention.
Figure 26:
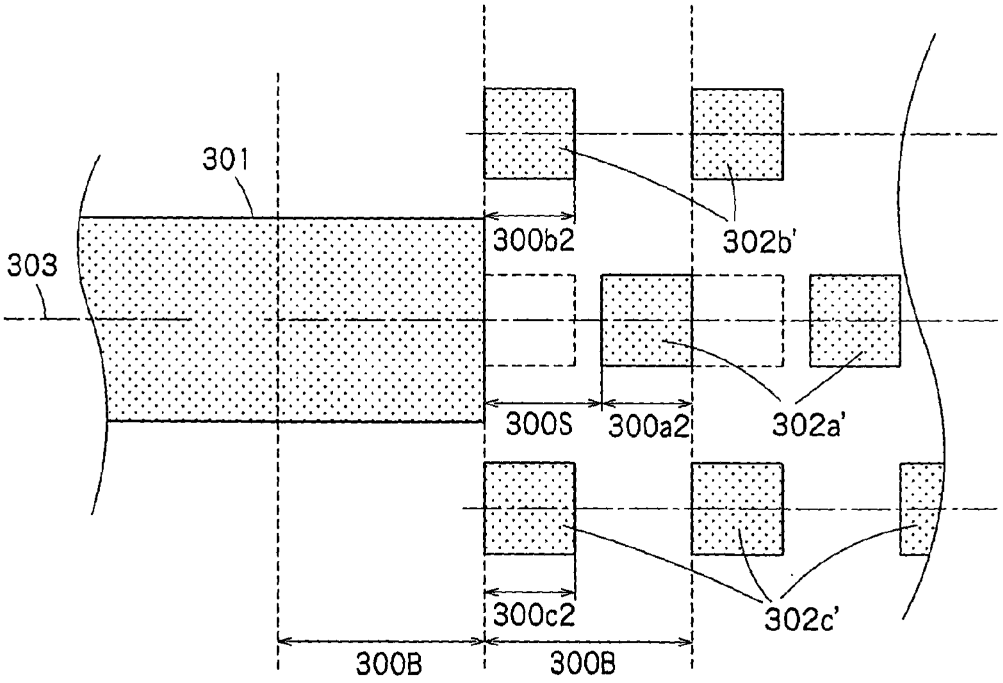
FIG. 26 is an enlarged view of the image lines of a portion having no latent image and periodic broken lines juxtaposed at a shifted period in the fourth embodiment.
Figure 27:
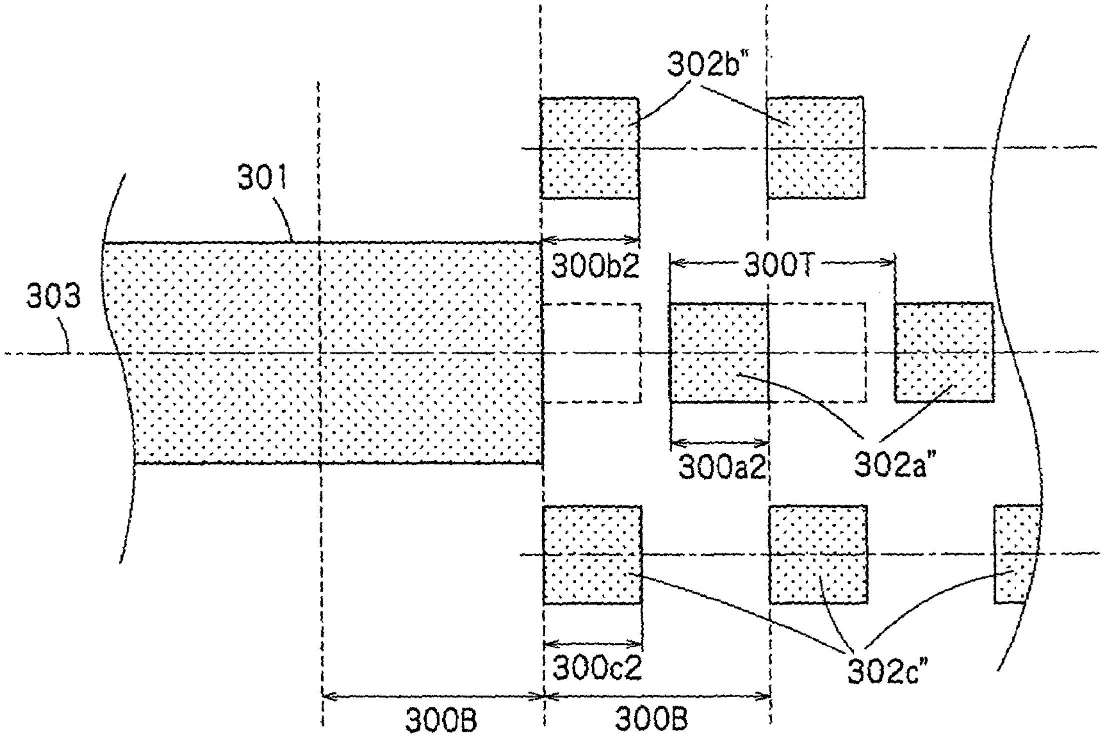
FIG. 27 is an enlarged view of the image lines of a portion having no latent image and periodic broken lines juxtaposed at different periods in the fourth embodiment.

To indicate the image line having a latent image of the fourth embodiment in more detail, FIG. 25 shows periodic broken lines, FIG. 26 shows periodic broken lines juxtaposed at a shifted period, and FIG. 27 shows periodic broken lines juxtaposed at different periods.

Referring to FIG. 25, let 300A is the image line width of an image line 301 having no latent image in the direction perpendicular to a reference line 303, 300*a* be the image line width of an image line portion passing through the reference line 303 in image lines 302*a*, 302*b*, and 302*c* made of periodic broken lines in the direction perpendicular to the reference line, 300*b* and 300*c* are the image line widths of periodic broken lines separated from the reference line 303 to the upper and lower sides by an equidistance 300H in the direction perpendicular to a central line 300H2, 300*a*2 be the length for the image line width 300*a* in the direction of reference line, 300*b*2 is the length for the image line width 300*b* in the direction of reference line, 300*c*2 is the length for the image line width 300*c* in the direction of reference line, 300*a*3 is the length of the non-image line portion of the periodic broken line having the image line width 300*a* in the direction of reference line, 300*b*3 is the length of the non-image line portion of the periodic broken line having the image line width 300*b* in the direction of reference line, and 300*c*3 is the length of the non-image line portion of the periodic broken line having the image line width 300*c* in the direction of reference line.

300B is the length of one period formed from a continuous image line portion and non-image line portion of the periodic broken lines in the direction of reference line, and 300*g* is the expansion value (or contraction value) generated around the image line portion in printing. In forming printed pattern having the authenticity discrimination pattern formed from periodic broken lines of the fourth embodiment, the image line areas of the image line 301 having no latent image and the image lines 302*a*, 302*b*, and 302*c* formed from periodic broken lines are important factors. A change in image line width of each image line portion in the direction perpendicular to the reference line 303 and a change in image line length in the direction of reference line are preferably taken into consideration. On the printed pattern, the image line width of the image line 301 having no latent image in the direction perpendicular to the reference line 303 is given by 300A+300*g*+300*g*, i.e., 300A+**2*300***g*. The image line widths of the image line portions of the image lines 302*a*, 302*b*, and 302*c* formed from periodic broken lines in the direction perpendicular to the reference line 303 are given by 300*a* +302*g*, 300*b*+302*g*, and 300*c*+302*g*, respectively. The lengths in the direction of reference line for the image line widths are given by 300*a*2+302*g*, 300*b*2+302*g*, and 300*c*2+302*g*, respectively.

The relationship between a region area 300X of the image line 301 having no latent image for which the expansion value generated around the image line in printing is taken into consideration and a region area Z1 of image line portions Y1, Y2, and Y3 of the image lines 302*a*, 302*b*, and 302*c* formed from broken lines for which the expansion value generated in printing is taken into consideration in the length 300B of one period in the direction of reference line is important. The region area 300X must almost equal the region area Z1, i.e., the sum of the areas of the image line portions Y1, Y2, and Y3.

More preferably, the total image line area of the image line portions Y1, Y2, and Y3 falls within the range of 95% to 110% of the region area 300X. This range is a density range in which the periodic broken lines in printing can be prevented from being visually recognized. Additionally, in this range, it can be visually recognized that copied periodic broken lines have almost the same color as the background color because the periodic broken lines almost disappear on a copied image, thus showing only the background color on the periodic broken line regions. The preferred range for the region area must be 95% to 110% although the range may vary depending on the hue of ink.

In printed pattern formed while setting the region area of the periodic broken lines to 95% or less and using color fluorescent ink, the region area is smaller than that of the portion having no latent image. Hence, the density decreases. as moving from the non-latent image. to the latent images. In such case, The periodic broken lines can be visually recognized. That is, the periodic broken lines are insufficiently invisible. In addition, when the printed pattern is irradiated with a predetermined wavelength such as UV rays, the difference in the brightness of fluorescent light emission is hardly generated between the image line of the portion having no latent image and the periodic broken lines. For this reason, the authenticity discrimination pattern formed from the periodic broken lines cannot be visually recognized. In printed pattern formed while setting the region area of the periodic broken lines to 110% or more and using color fluorescent ink, the region area of the periodic broken lines is larger than that of the image line of the portion having no latent image. For this reason, the density increases. as moving from the non-latent image to the latent image. The periodic broken lines can be visually recognized. That is, the periodic broken lines are insufficiently invisible. At the time of image line design, the following relationship is preferably satisfied.

$$0.95*300B(300A+2*300g)\leqq[(300a2+2*300g)\times(300a+2*300g)]+[(300b2+2*300g)\times(300b+2*300g)]+[(300c2+2*300g)\times(300c+2*300g)]\leqq 1.1*300B(300A+2*300g) \tag{6}$$

The lengths 300*a*, 300*b*, 300*c*, 300*a*2, 300*b*2, and 300*c*2 of the image line portions of the periodic broken lines on the printed pattern are preferably 64 μm or less, which is a standard length hardly recognized by a copying machine. The lengths 300*a*3, 300*b*3, and 300*c*3 of the non-image line portions of the periodic broken lines in the direction of reference line are set within the range of 25 to 60 μm in which the non-image line portions are not recognized by a copying machine.

When the image lines of the portions having no latent image and the periodic broken lines having a latent image are printed using color fluorescent ink, the periodic broken lines are visually recognized as if they were one image line. For this reason, the periodic broken lines are recognized as if they were on the extended line of the image line of the portion having no latent image. The authenticity discrimination pattern formed from the periodic broken lines cannot be visually recognized easily.

When the printed pattern having the periodic broken line is irradiated with a predetermined wavelength such as UV rays, the brightness of fluorescent light emission is higher in the periodic broken lines than in the image line of the portion having no latent image because the periodic broken lines are subdivided from the image line having no latent image. Since a difference in the brightness of fluorescent light emission is generated between the periodic broken lines and the image line of the portion having no latent image, the authenticity discrimination pattern formed from the periodic broken lines appears.

When the printed pattern having the periodic broken line is copied by a copying machine, the image line of the portion having no latent image is directly reproduced while the periodic broken lines are not reproduced or are irreproducible because of the resolution of the copying machine. For this reason, when the copy is visually observed, the image line of the portion having no latent image is recognized as one image line continuous in the direction of reference line. while the periodic broken lines are subdivided and become unnoticeable. A density difference is generated between the periodic broken lines and the image line of the portion having no latent image. Because a copy machine's resolution is not fine enough to recognize the periodic broken lines, the periodic broken lines are visually recognized to have almost the same color as the background color on a copied image, and the authenticity discrimination pattern formed from the periodic broken lines appears.

FIG. 26 is a view showing periodic broken lines juxtaposed at a shifted period. Unlike the arrangement of the image lines 302*a*, 302*b*, and 302*c* formed from periodic broken lines shown in FIG. 25, in image lines 302*a*', 302*b*', and 302*c*' formed from periodic broken lines juxtaposed at a shifted period, one image line 302*a*' has a shift 300S from the two remaining branched image lines 302*b*' and 302*c*'. As for the value of the shift 300S of one image line 302*a*' the more the value of the shift is approximated to the value of the lengths 300*b*2 and 3002*c* of the two remaining branched image lines in the direction of reference line, the more clearly the authenticity discrimination pattern appears when the authenticity discrimination pattern formed from the periodic broken lines juxtaposed at a shifted period is irradiated with a predetermined wavelength such as UV rays or copied by a copying machine.

FIG. 27 is a view showing periodic broken lines juxtaposed at different periods. Unlike the arrangement of the image lines 302*a*, 302*b*, and 302*c* formed from periodic broken lines shown in FIG. 25, for image lines 302*a*", 302*b*", and 302*c*" juxtaposed at different periods, let 300T be the length of one period formed from the image line portion and non-image line portion of one image line 302*a*" in the direction of reference line, and 300B be the length of one period formed from the image line portion and non-image line portion of each of the two remaining branched image lines 302*b*" and 302*c*" in the direction of reference line. The length 300T of one period formed from the image line portion and non-image line portion in the direction of reference line is set to be larger than the length 300B of one period formed from the image line portion and non-image line portion in the direction of reference line. The larger the value of the length 300T of one period formed from the image line portion and non-image line portion in the direction of reference line becomes within the range where the region area can be taken into consideration, the more clearly the authenticity discrimination pattern appears when the authenticity discrimination pattern formed from the periodic broken lines juxtaposed at different periods is irradiated with a predetermined wavelength such as UV rays or copied by a copying machine.

For the periodic broken lines juxtaposed at a shifted period or periodic broken lines juxtaposed at different periods, the total image line area of the image lines having a length corresponding to one period formed from an image line portion and non-image line portion of a periodic broken line which is divided in the direction perpendicular to the reference line in the broken line having a latent image preferably falls within the range of 95% to 110% of the image line area of the solid line of the portion corresponding to the same length as that of one period in the broken lines divided in the direction perpendicular to the reference line in the solid line of the portion having no latent image.

Figure 28:
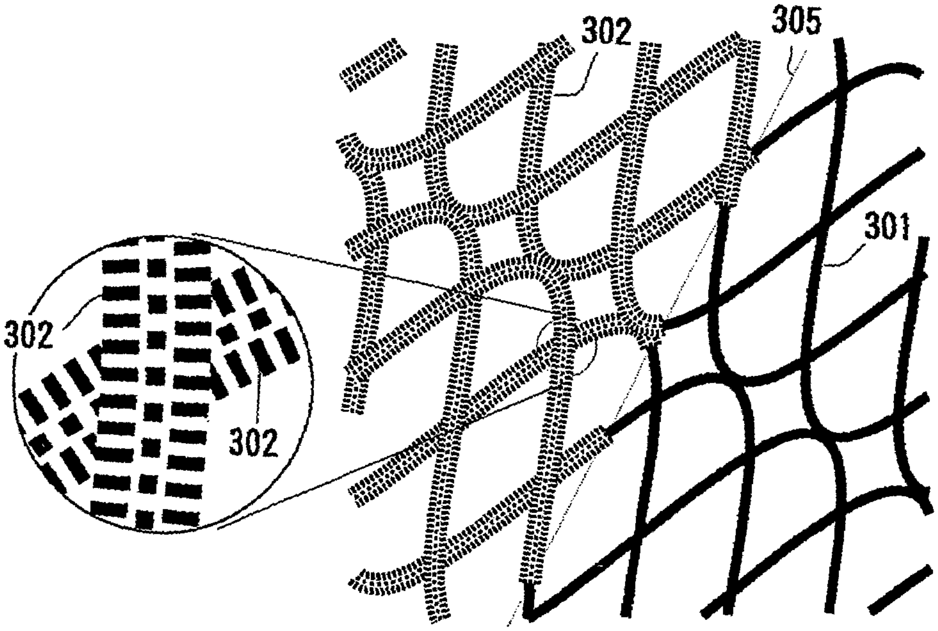
FIG. 28 is an explanatory view showing a state wherein one of areas where the image lines cross is deleted in the fourth embodiment.
Figure 29:
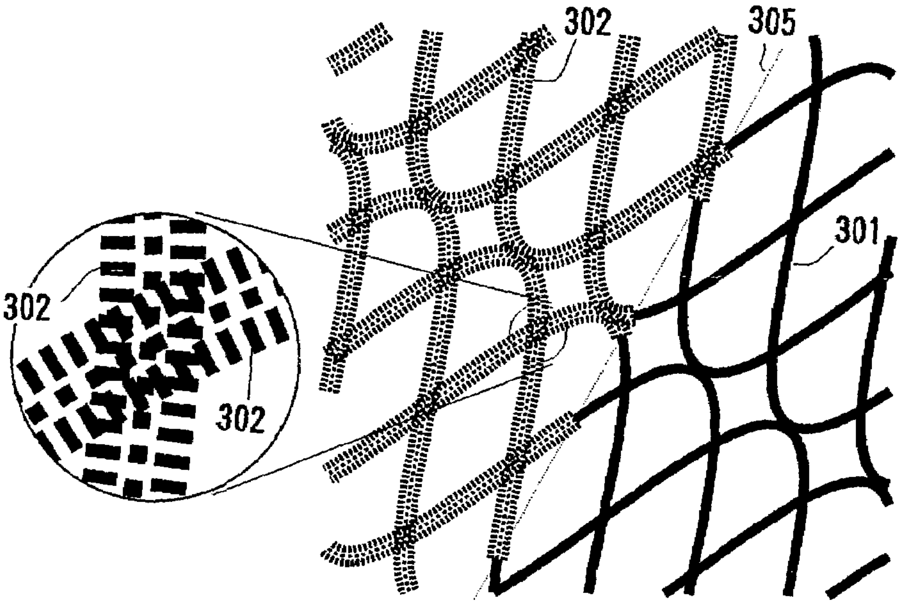
FIG. 29 is an explanatory view of an area where the image lines cross in the fourth embodiment.

As shown in FIG. 28, in a region where the image lines 302 of the periodic broken lines of the fourth embodiment cross, the overlapping portion at the crossing section of one of the image lines 302 is deleted. Assume that, when the overall authenticity discrimination pattern of the fourth embodiment is observed, a region where the curved image lines in the authenticity discrimination pattern cross is apparently present. In fact, the crossing (superposition) of the image lines 302 of the periodic broken lines is not present. Hence, any increase in image line density that may occur at the crossing portion can be prevented. More specifically, when the authenticity discrimination pattern using the periodic broken lines is formed, the image lines 302 of the periodic broken lines sometimes completely cross each other, as shown in FIG. 27. In this case, in the region where two image lines cross, one of the image lines is deleted at the overlapping portion in the crossing section, as shown in FIG. 28. With this process, when the printed matter is irradiated with a predetermined wavelength such as UV rays, the image lines in the region where the image lines of the periodic broken lines cross cause fluorescent light emission at the same lightness without any difference in the brightness of fluorescent light emission. Hence, the latent image in the authenticity discrimination pattern formed from the periodic broken lines appears more clearly. When the printed pattern is copied by a copying machine, reproduction of the image lines in the region where the image lines cross (superpose) is prevented while the image lines having no latent image are accurately reproduced because one of the image lines is deleted in the region where the image lines cross. However, the image lines of the periodic broken lines are not reproduced, or show a reproduction error resulting almost the same color as the background color. Since a density difference is generated between the image lines of the periodic broken lines and the image lines of the portion having no latent image, and also visual recognition of the latent image is not impeded, the authenticity discrimination pattern appears more clearly. At a portion where image lines of a portion having non-latent image, broken lines, periodic broken lines, periodic broken lines juxtaposed at a shifted period, periodic broken lines juxtaposed at different periods or some kinds of these image lines cross, when one of the crossing image lines is deleted at the overlapping region, the same effect as described above can be obtained.

When the sum of image line areas of image lines having a length corresponding to one period formed from the image line portion and non-image line portion of a divided line divided in the direction of reference line almost equals the image line area of the solid line of the portion corresponding to the same length as that of one period in the broken lines divided in the direction perpendicular to the reference line in the solid line of the portion having no latent image, the image line areas divided in the direction of reference line may be different. A camouflage pattern such as a ground tint may be overprinted on the printed matter having the image line structure of the fourth embodiment.

The numerical values used in this embodiment are not particularly limited and can be changed as needed.

For the fourth embodiment, an example in which a lathe work pattern was formed using a commercially available CGS will be further described.

To design image lines at plate making in consideration of the expansion value (or contraction value) of image lines in printing, the expansion value (or contraction value) was examined in advance by test image lines. The image line width on the plate making film master was set to 100 μm. Test image lines were offset-printed using commercially available wood-free paper sheets and commercially available offset ink (pink). Then, the image line width on the printed patter was measured as 106 μm. Hence, the expansion value of the image lines in the direction of image line width is 6 μm as a whole. The expansion value (or contraction value) generated around the image lines in printing was 3 μm.

Figure 30:
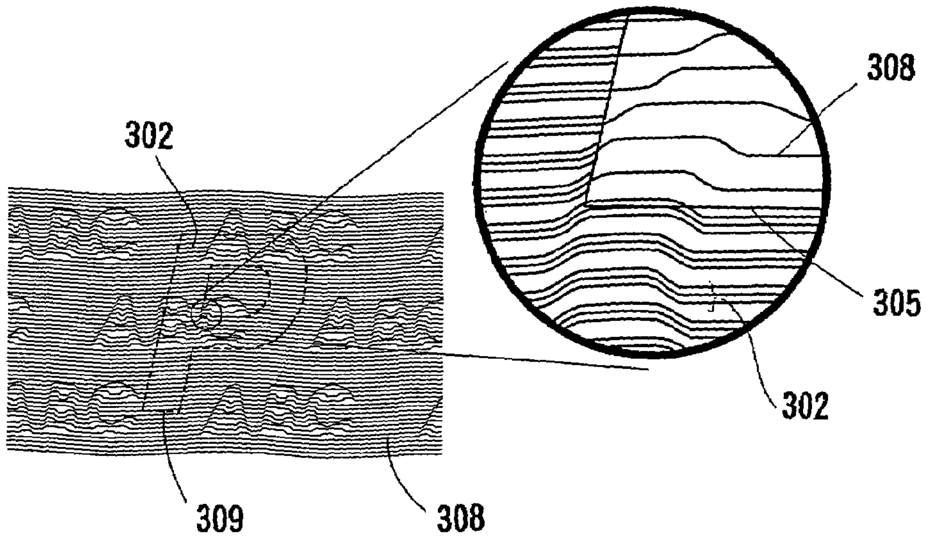
FIG. 30 shows an explanatory view and a partial enlarged view showing image lines on the two-dimensional data of an authenticity discrimination pattern in the fourth embodiment.

A printing plate to be used to obtain printed pattern in which the printed image line width in the direction perpendicular to the reference line of a solid line having no latent image was 106 μm was prepared using the expansion value of 3 μm that was obtained by test image lines as an expansion value to be generated around the image lines. Using a commercially available CGS, a pattern formed from a plurality of image lines as shown in FIG. 30 is designed. A reference line 308 formed from a spline curve is a moderate wavy line. The reference lines 308 formed from spline curves were set on a two-dimensional coordinate system. An authenticity discrimination pattern 309 formed from periodic broken line and juxtaposed at an interval of 300 μm was laid out on the reference lines 308 formed from spline curves. The authenticity discrimination pattern 309 formed from the periodic broken lines is a graphic pattern that is visually invisible. The authenticity discrimination pattern 309 may be any one of a character, number, and graphic pattern as long as it can clearly visually be identified when the printed pattern is copied by a misguided person.

At the boundary between the image lines having no latent image and the periodic broken lines, the reference line 308 is separated by a contour line 305 of the authenticity discrimination pattern, as shown in FIG. 30. Image lines surrounded by the authenticity discrimination pattern 309 made of the periodic broken lines are gathered, and image lines are formed on the upper and lower sides of the central line of the reference line 308 at an equidistance of 80 μm. The image line width and the numerical value of the periodic broken line are substituted using the spline curves. The image lines are formed on the upper and lower sides of the central line at an equidistance of 80 μm. This is because the reference line 308 is set to 300 μm. However, the interval must be set such that the image lines of the periodic broken lines do not overlap. The value must be changed depending on the interval between the base lines 308.

The printed image line width of the image line 301 having no latent image in the direction perpendicular to the reference line 303 in FIG. 25 was set to 106 μm. The image line width 300A on the image line design was set to 100 μm by subtracting the expansion value of (3+3) μm of the image line in the direction of image line width, which was grasped in the above-described test image lines.

Next, the image lines of the authenticity discrimination pattern formed from periodic broken lines, i.e., the image line widths 300*a*, 300*b*, and 300*c* of the image lines 302*a*, 302*b*, and 302*c* of the authenticity discrimination pattern formed from periodic broken lines in the direction perpendicular to the reference line 303 of the image line portions of the periodic broken lines, the lengths 300*a*2, 300*b*2, and 300*c*2 of the image line portions of the image lines of the authenticity discrimination pattern formed from periodic broken lines in the direction of reference line, and the lengths 300*a*3, 300*b*3, and 300*c*3 of the non-image line portions of the image lines of the authenticity discrimination pattern formed from periodic broken lines in the direction of reference line in FIG. 25 must be set.

In setting the lengths 300*a*2+302*g*, 300*b*2+302*g*, and 300*c*2+302*g* of the image line portions of the image lines of the authenticity discrimination pattern formed from periodic broken line on the printed matter in the direction of reference line, the latent image must be prevented from being visible and being resolved by a copying machine.

When the output resolution of a general copying machine is assumed to be 400 dpi, one pixel corresponds to 64 μm. Hence, a length at which the latent image cannot easily be resolved is 64 μm or less. For the image lines of the authenticity discrimination pattern formed from periodic broken lines, the length 300*a*+302*g* was set to 56 μm, the length 300*b*+302*g* was set to 56 μm, and the length 300*c*+302*g* was set to 56 μm. The equidistance 300H set on the upper and lower sides of the reference line 303 was set to 80 μm to prevent the image lines of the periodic broken line from overlapping. The length 300*a*2+302*g* was set to 56 μm, the length 300*b*2+302*g* was set to 56 μm, and the length 300*c*2+302*g* was set to 56 μm. The length of the non-image line portion in the direction of reference line must be selected from the range of 25 to 60 μm wherein the latent image is not visually recognized and not resolved by a copying machine. The length 300*a*3 was set to 31 μm, the length 300*b*3 was set to 31 μm, and the length 300*c*3 was set to 31 μm.

By subtracting the expansion value of (3+3) μm of the image line in the direction of reference line, which was obtained from the test image lines, the image line width 300*a* was set to 50 μm, the image line width 300*b* was set to 50 μm, the image line width 300*c* was set to 50 μm, the length 300*a*2 was set to 50 μm, the length 300*b*2 was set to 50 μm, and the length 300*c*2 was set to 50 μm. The length 300B was obtained by subtracting the expansion value of (3+3) μm from the non-latent image line portion length of 31 μm and adding the image line portion length of 56 μm to the resultant value, i.e., (31−6)+56=81.

These values are substituted into inequality (6). Since $0.95\times81\times106 \leqq 56\times56+56\times56+56\times56 \leqq 1.1\times8\times106$, the result after calculation $8156.7 \leqq 9408 \leqq 9444.6$ shows that the condition is satisfied.

A film master for making a plate was generated using a commercially available laser plotter, and a printing plate was made using a commercially available positive type PS. Subsequently, 475 g of ink (DIC797: DAINIPPON INK AND CHEMICALS, INCORPORATED) were mixed with 25 g of fluorescent pigment (Lumikol 1000: Nippon Keikou Kagaku KK) to prepare color fluorescent ink. Using the obtained printing plate and color fluorescent ink, the pattern was printed on commercially available wood-free paper sheets by an offset press. The printed matter shown in FIG. 31 was obtained.

Figure 31:
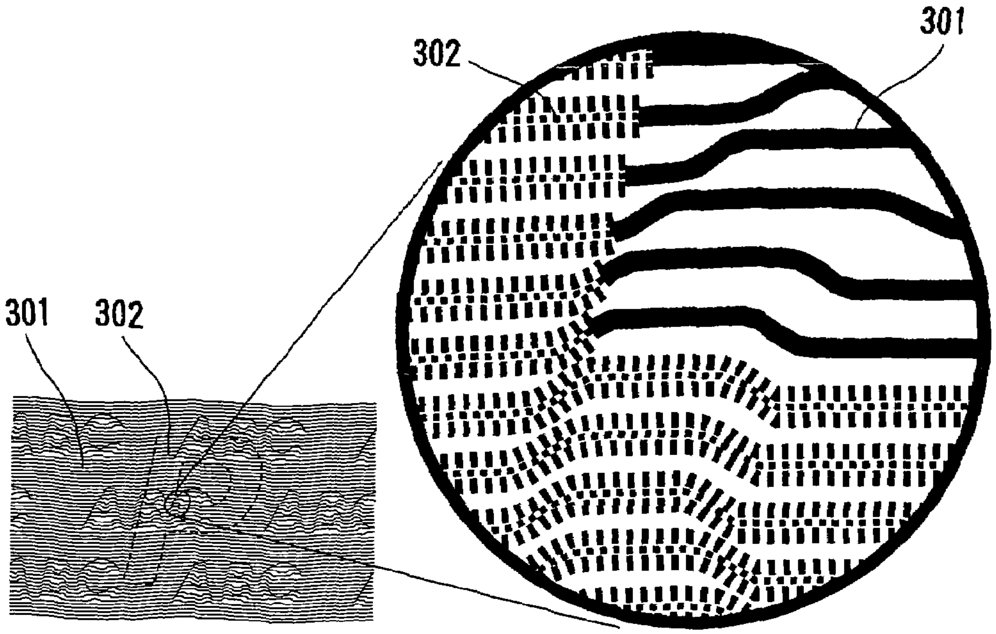
FIG. 31 shows an explanatory view and a partial enlarged view showing printed pattern having the authenticity discrimination pattern formed from periodic broken lines in the fourth embodiment.

The printed matter shown in FIG. 31 is visually observed. The authenticity discrimination pattern 302 as image lines of a portion having a latent image are formed from periodic broken lines. However, when examined visually the authenticity discrimination pattern is recognized as if it were one image line continued from the image line 301 of a portion having no latent image. Hence, the authenticity discrimination pattern formed from the periodic broken line cannot be visually identified easily. Hence, in the authenticity discrimination pattern 302 formed from periodic broken lines, the observer cannot easily recognize the the presence of the image lines formed from the periodic broken lines unless he/she tries to enlarge the printed image lines.

Figure 32:
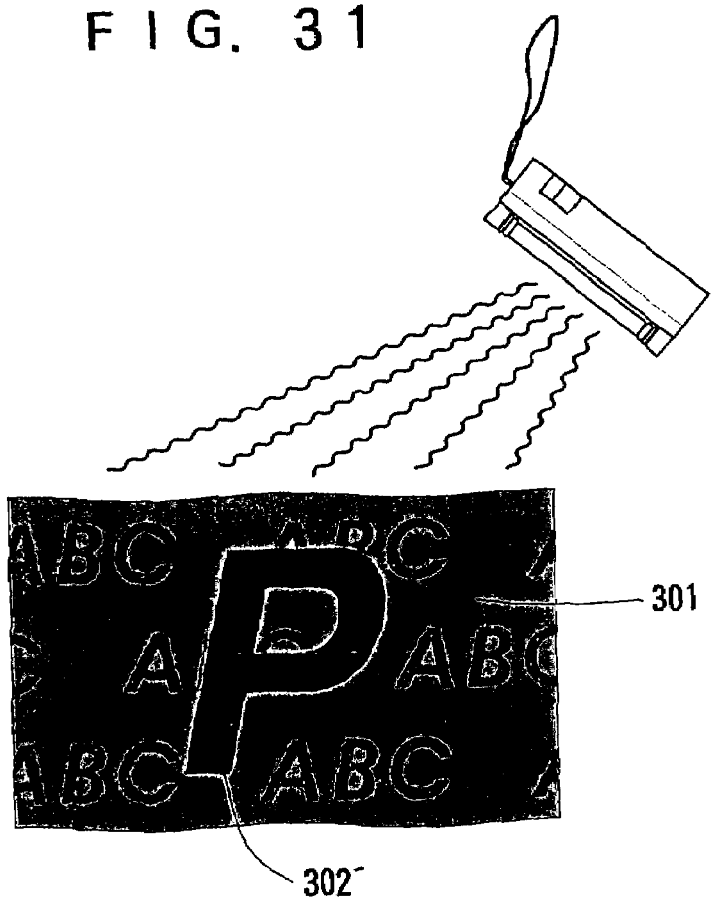
FIG. 32 is an explanatory view showing a state wherein the printed pattern having the authenticity discrimination pattern formed from periodic broken lines is irradiated with UV rays in the fourth embodiment.

FIG. 32 shows a state wherein the printed patter is irradiated with UV rays having a wavelength of 365 nm. The brightness of fluorescent light emission lightness is higher in an authenticity discrimination pattern 302' of latent image than in an image line 301' having no latent image. Hence, the difference in the brightness of a light emission is generated between the authenticity discrimination pattern 302' formed from the periodic broken lines and the image line 301' having no latent image. The authenticity discrimination pattern formed from periodic broken lines appears and become visually recognizable.

Figure 33:
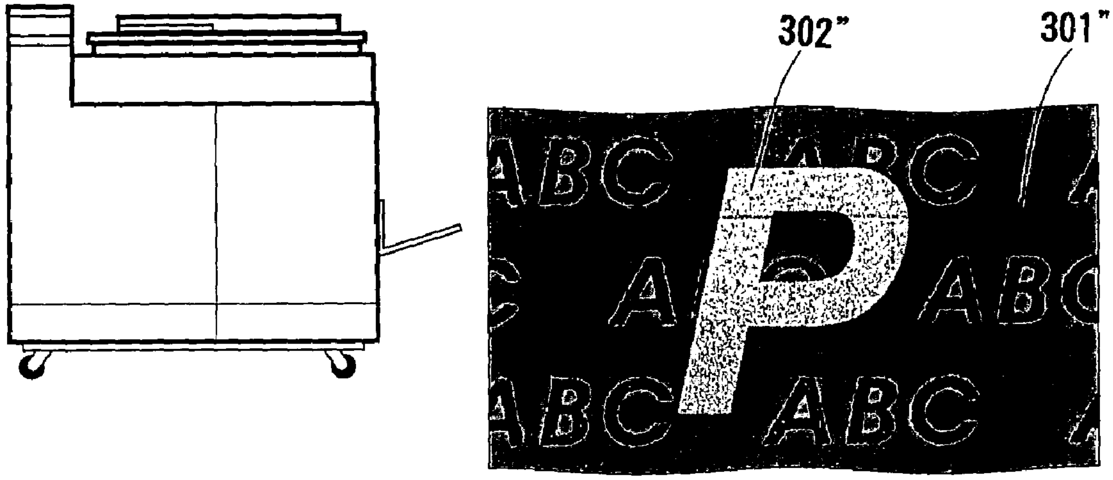
FIG. 33 is an explanatory view showing a copy obtained by copying the printed pattern having the authenticity discrimination pattern formed from periodic broken lines using a color copying machine in the fourth embodiment.

FIG. 33 shows a copy obtained by copying the printed matter using a color copying machine (e.g., CL900 available from CANON INC., PATER750 available from RICOH CO., LTD, or CF900 available from Minolta Co., Ltd). An authenticity discrimination pattern 302" is irreproducible by a copying machine. A density difference is generated between the authenticity discrimination pattern 302" formed from periodic broken lines and an image line 301", having no latent image. The authenticity discrimination pattern 302" formed from periodic broken lines have almost the same color as the background color. Hence, the authenticity discrimination pattern formed from the periodic broken lines appears and can be visually recognized.

The above-described embodiments are mere examples. The present invention is not limited to these embodiments, and various changes and modifications can be made without departing from the scope of the appended claims. In addition, the numerical values used in the above embodiments are not particularly limited and can be changed as needed.

As described above, according to this embodiment, a latent image which can rarely be recognized under ordinary visible light but can be visually recognized under UV rays is formed. In addition, when the printed matter is copied by a copying machine, the latent image is recognized by anti-copy image lines. Since the authenticity of the copy can be discriminated by the anti-copy image lines without using any UV irradiator, the anti-forgery effect can be increased. The image lines of a portion having a latent image are subdivided into periodic broken lines. For this reason, when the image lines of a portion having no latent image and those of a portion having a latent image are irradiated with a predetermined wavelength such as UV rays or copied by a copying machine, the latent image can more clearly appear.

In addition, when the image lines of a portion having a latent image are formed from periodic broken lines juxtaposed at a shifted period or at different periods, the latent image can more clearly appear upon being irradiated with a predetermined wavelength such as UV rays or copied by a copying machine.

Identification can be done using a handy and portable UV irradiator. Hence, authenticity can easily be discriminated anywhere at low cost.

Furthermore, since printing needs to be executed only once using visible color fluorescent ink, no colorless fluorescent ink need be overprinted on printed matter having anti-copy image lines. The problem of fitting can be solved, and the cost of materials and the number of printing steps can be reduced. In addition, since the density management, image line thickening adjustment, and the like in printing are facilitated, the authenticity discrimination effect can be obtained even when the allowable range in printing is wide.

Printed pattern having, in addition to a ground tint pattern or lathe work pattern, another kind of anti-forgery measure such as a moiré pattern on the same image lines may be formed. The authenticity discrimination effect does not decrease even when an embossed pattern (three-dimensional pattern) is formed after printing. Hence, this embodiment can be applied to securities including banknotes, stock certificates, and bonds, various kinds of certificates, and important documents which must not be forged or altered.

The invention claimed is:

1. An authenticity discriminable printed pattern in which a latent image that is formed on a collective pattern cannot be visually identified easily under ordinary visible light but becomes visible upon being irradiated with UV rays, said authenticity discriminable printed pattern comprising:

a basic image formed on a base material, said basic image including:

a latent image portion; and a latent image peripheral portion, wherein the latent image portion and the latent image peripheral portion are difficult to be discriminated under the ordinary visible light, each of the latent image portion and the latent image peripheral portion is formed from a set of dots continuously laid out at a predetermined period, a resolution of the dots of the latent image portion is different from that of the dots of the latent image peripheral portion, the latent image portion and the latent image peripheral portion have the same percent dot area per unit area and different dot peripheral lengths per unit area, and the latent image portion and latent image peripheral portion are printed by color fluorescent ink.

2. The printed pattern according to claim 1, wherein the dot peripheral length per unit area of the dots of the latent image portion is not less than twice the dot peripheral length per unit area of the dots of the latent image peripheral portion.

3. The printed pattern according to claim 1, wherein the dot has one of a square dot shape, chain dot shape, round dot shape, and a combination thereof.

4. The printed pattern according to claim 1, wherein a camouflage pattern is further printed on the printed matter.

5. A method of generating an authenticity discriminable printed pattern in which a latent image that is formed on a collective pattern cannot be visually identified easily under ordinary visible light but becomes visible upon being irradiated with UV rays, said method comprising the steps of:

making a design for a basic image having a latent image portion and a latent image peripheral portion, the latent image portion and the latent image peripheral portion being difficult to be discriminated under the ordinary visible light, each of the latent image portion and the latent image peripheral portion being formed from a set of dots continuously laid out at a predetermined period, a resolution of the dots of the latent image portion being different from that of the dots of the latent image peripheral portion, and the latent image portion and the latent image peripheral portion having the same percent dot area per unit area and different dot peripheral lengths per unit area; and printing the latent image portion and the latent image peripheral portion according to the design on a base material using color fluorescent ink.

6. The method according to claim 5, wherein the dot peripheral length per unit area of the dots of the latent image portion is not less than twice the dot peripheral length per unit area of the dots of the latent image peripheral portion.

7. The method according to claim 5, wherein the dot has one of a square dot shape, chain dot shape, and round dot shape, or a combination thereof.

8. The method according to claim 5, wherein a camouflage pattern is further printed on the printed matter.

9. An authenticity discriminable printed pattern in which a latent image that is formed on a curved collective pattern cannot be visually identified easily under ordinary visible light but becomes visible upon being irradiated with UV rays, said authenticity discriminable printed pattern comprising:

the curved collective pattern including:

one image line having no latent image; and a plurality of branched image lines that have the latent image and are visually recognized as one continuous line, wherein the curved collective pattern is designed so as to make a sum of image line widths of the plurality of branched image lines substantially equal an image line width of said one image line and a sum of image line peripheral lengths in a predetermined length of the plurality of branched image lines in a direction of curved reference line different from a sum of image line different from a sum of image line peripheral length of said one image line in the direction of curved reference line, and said one image line and the plurality of branched image lines are printed by color fluorescent ink.

10. The printed pattern according to claim 9, wherein the sum of the image line widths of the plurality of branched image lines falls within a range of 90% to 110% of the image line width of said one image line.

11. The printed pattern according to claim 9, wherein sum of the image line peripheral lengths per unit printing area of the plurality of branched image lines is not less than 1.4 times the sum of the image line peripheral lengths per unit printing area of said one image line.

12. The printed pattern according to claim 9, wherein at a portion where image lines of said one image line, image lines of the plurality of branched image lines, or said one image line and the plurality of branched image lines cross, one of the crossing image lines is deleted.

13. The printed pattern according to claim 9, wherein the curved collective pattern is one of a ground tint pattern, lathe work pattern, relief pattern, and a combination thereof.

14. A method of generating an authenticity discriminable printed pattern in which a latent image that is formed on a curved collective pattern cannot be visually identified easily under ordinary visible light but becomes visible upon being irradiated with UV rays, said method comprising the steps of:

making a design for the curved collective pattern that is formed from one image line having no latent image and a plurality of branched image lines which have the latent image and are visually recognized as one continuous line, wherein the curved collective pattern is designed so as to make a sum of image line widths of the plurality of branched image lines substantially equal an image line width of said one image line and a sum of image line peripheral lengths in a predetermined length of the plurality of branched image lines in a direction of curved reference line different from a sum of image line peripheral lengths in the predetermined length of said one image line in the direction of curved reference line; and printing one image line and the plurality of branched image lines according to the design using color fluorescent ink.

15. The method according to claim 14, wherein the sum of the image line widths of the plurality of branched image lines falls within a range of 90% to 110% of the image line width of said one image line.

16. The method according to claim 14, wherein the sum of the image line peripheral lengths per unit printing area of the plurality of branched image lines is not less than 1.4 times the sum of the image line peripheral lengths per unit printing area of said one image line.

17. The method according to claim 14, wherein at a portion where image lines of said one image line, image lines of the plurality of branched image lines, or said one image line and the plurality of branched image lines cross, one of the crossing image lines is deleted.

18. The method according to claim 14, wherein the curved collective pattern is one of a ground tint pattern, lathe work pattern, relief pattern, and a combination thereof.

19. An authenticity discriminable printed pattern in which a latent image that is formed on a curved collective pattern cannot be visually identified easily under ordinary visible light but becomes visible upon being irradiated with UV rays, said authenticity discriminable printed pattern comprising:

the curved collective pattern including non-latent image line formed from a solid line having no latent image; and a latent image line formed from a periodic broken line having the latent image, the periodic broken line being formed from image lines which have a predetermined shape and are visually recognized as one continuous line and laid out in a direction of curved reference line, wherein the curved collective pattern is designed so as to make an image line area of a portion formed from one image line portion and one non-image line portion corresponding to one period of the periodic broken line substantially equal an image line area of the solid line having a length corresponding to one period of the periodic broken line and an image line peripheral length of the portion formed from one image line portion and one non-image line portion corresponding to one period of the periodic broken line different from an image line peripheral length of the solid line corresponding to one period of the periodic broken line, and the image line formed from the solid line and the image line formed from the periodic broken line are printed by color fluorescent ink.

20. The printed pattern according to claim 19, wherein the image line area of the portion corresponding to one period of the periodic broken line falls within a range of 90% to 110% of the image line area of a portion of the solid line corresponding to the same length as one period in the periodic broken line.

21. The printed pattern according to claim 19, wherein the image line peripheral length of the portion corresponding to one period of the periodic broken line is not less than 1.1 times that of the image line peripheral length of the portion of the solid line corresponding to the same length as one period in the periodic broken line.

22. The printed pattern according to claim 19, wherein at a portion where image lines formed from the solid lines, image lines formed from periodic broken lines, an image line formed from the solid line and an image line formed from the periodic broken line cross, one of the crossing image lines is deleted.

23. The printed pattern according to claim 19, wherein the curved collective pattern is one of a ground tint pattern, lathe work pattern, relief pattern, and a combination thereof.

24. The method of generating an authenticity discriminable printed pattern in which a latent image that is formed on a curved collective pattern cannot be visually identified easily under ordinary visible light but appears upon being irradiated with UV rays, said method comprising the steps of:

making a design for the curved collective pattern that is made of a non-latent image line formed from a solid line having no latent image and a latent image line formed from a periodic broken line having the latent image, the periodic broken line being formed from image lines which have a predetermined shape and are visually recognized as one continuous line and laid out in a direction of curved reference line, wherein the curved collective pattern is designed so as to make an image line area of a portion formed from one image line portion and one non-image line portion corresponding to one period of the periodic broken line substantially equal an image line area of the solid line having a length corresponding to one period of the periodic broken line and an image line peripheral length of the portion formed from one image line portion and one non-image line portion corresponding to one period of the periodic broken line different from an image line peripheral length of the solid line corresponding to one period of the periodic broken line; and printing according to the design the non-latent image line formed from the solid line and the latent image line formed from the periodic broken line using color fluorescent ink.

25. The method according to claim 24, wherein the image line area of the portion corresponding to one period of the periodic broken line falls within a range of 90% to 110% of the image line area of a portion of the solid line corresponding to the same length as one period in the periodic broken line.

26. The method according to claim 24, wherein the image line peripheral length of the portion corresponding to one period of the periodic broken line is not less than 1.1 times that of the image line peripheral length of the portion of the solid line corresponding to the same length as one period in the periodic broken line.

27. The method according to claim 24, wherein at a portion where image lines formed from the solid lines, image lines formed from periodic broken lines, an image line formed from the solid line and an image line formed from the periodic broken line cross, one of the crossing image lines is deleted.

28. The method according to claim 24, wherein the curved collective pattern is one of a ground tint pattern, lathe work pattern, relief pattern, and a combination thereof.

29. An authenticity discriminable printed pattern in which a latent image is formed on an image line pattern formed from one or a plurality of image lines using a straight line or curved line as an image line portion, said authenticity discriminable printed pattern comprising:

an image line of a portion having no latent image in the image line pattern formed from a solid line; and an image line of a portion having the latent image formed from image lines made of broken lines obtained by using a reference line as a central portion of the solid line as a reference, substantially equidistantly branching the image line into a plurality of image lines in a direction perpendicular to the reference line, and dividing each of the plurality of branched image lines in a direction substantially perpendicular to the reference line, wherein the broken lines are formed from image lines for which a sum of image line areas of the image lines having a length of a portion corresponding to one period formed from an image line portion and a non-image line portion of the broken line divided in the direction of reference line in the broken lines of the portion having the latent image substantially equals an image line area of the solid line of a portion corresponding to the same length as one period in the broken lines divided in the direction substantially perpendicular to the reference line in the solid line of the portion having no latent image, and the image line of the portion having no latent image and the broken lines of the portion having the latent image are printed by color fluorescent ink.

30. The printed pattern according to claim 29, wherein the image lines of the portion having the latent image are periodic broken lines made of broken lines having a shape obtained by using the reference line as the central portion of the solid line as the reference, substantially equidistantly branching the image line into a plurality of image lines in the direction perpendicular to the reference line, dividing each of the plurality of branched image lines in the direction substantially perpendicular to the reference line, and laying out the image lines at a substantially predetermined interval.

31. The printed pattern according to claim 29, wherein the image lines of the portion having the latent image are periodic broken lines juxtaposed at a shifted period, in which using the reference line as the central portion of the solid line as the reference, the image lines are substantially equidistantly branched into a plurality of image lines in the direction perpendicular to the reference line, the plurality of branched image lines are formed from broken lines divided in the direction substantially perpendicular to the reference line and laid out at a predetermined interval, and at least one of the plurality of branched image lines is shifted from the remaining branched image lines.

32. The printed pattern according to claim 29, wherein the image lines of the portion having the latent image are periodic broken lines juxtaposed at different periods, in which using the reference line as the central portion of the solid line as the reference, the image lines are substantially equidistantly branched into a plurality of image lines in the direction perpendicular to the reference line, the plurality of branched image lines are formed from broken lines divided in the direction substantially perpendicular to the reference line and laid out at a predetermined interval, and at least one of the plurality of branched image lines is laid out at a period different from that of the remaining branched image lines.

33. The printed pattern according to claim 29, wherein the sum of image line areas of the image lines having the length of the portion corresponding to one period formed from the image line portion and the non-image line portion of the broken line divided in the direction perpendicular to the reference line in the broken lines of the portion having the latent image falls within a range of 95% to 110% of an image line area substantially equal to the image line area of the solid line of the portion corresponding to the same length as one period in the broken lines divided in the direction substantially perpendicular to the reference line in the solid line of the portion having no latent image.

34. The printed pattern according to claim 29, wherein at a portion where the image lines of the portion having no latent image, the broken lines, the periodic broken lines, the periodic broken lines juxtaposed at the shifted period, the periodic broken lines juxtaposed at the different periods, or any two kinds of the image lines cross, one of the crossing image lines is deleted.

35. The printed pattern according to claim 29, wherein the image line pattern is at least one of a ground tint pattern, lathe work pattern, and relief pattern.

36. A method of generating an authenticity discriminable printed pattern in which a latent image is formed on an image line pattern formed from one or a plurality of image lines using a straight line or curved line as an image line portion, said method comprising the steps of:

making a design for an image line of a portion having no latent image in the image line pattern which is formed from a solid line, an image line of a portion having the latent image which is formed from image lines made of broken lines obtained by using a reference line as a central portion of the solid line as a reference, substantially equidistantly branching the image line into a plurality of image lines in a direction perpendicular to the reference line, and dividing each of the plurality of branched image lines in a direction substantially perpendicular to the reference line, wherein the broken lines are formed from image lines for which a sum of image line areas of the image lines having a length of a portion corresponding to one period formed from an image line portion and a non-image line portion of the broken line divided in the direction of reference line in the broken lines of the portion having the latent image substantially equals an image line area of the solid line of a portion corresponding to the same length as one period in the broken lines divided in the direction substantially perpendicular to the reference line in the solid line of the portion having no latent image; and printing according to the design the image line of the portion having no latent image and the broken lines of the portion having the latent image using color fluorescent ink.

37. The method according to claim 36, wherein the image lines of the portion having the latent image are periodic broken lines made of broken lines having a shape obtained by using the reference line as the central portion of the solid line as the reference, substantially equidistantly branching the image line into a plurality of image lines in the direction perpendicular to the reference line, dividing each of the plurality of branched image lines in the direction substantially perpendicular to the reference line, and laying out the image lines at a substantially predetermined interval.

38. The method according to claim 36, wherein the image lines of the portion having the latent image are periodic broken lines juxtaposed at a shifted period, in which using the reference line as the central portion of the solid line as the reference, the image lines are substantially equidistantly branched into a plurality of image lines in the direction perpendicular to the reference line, the plurality of branched image lines are formed from broken lines divided in the direction substantially perpendicular to the reference line and laid out at a predetermined interval, and at least one of the plurality of branched image lines is shifted from the remaining branched image lines.

39. The method according to claim 36, wherein the image lines of the portion having the latent image are periodic broken lines juxtaposed at different periods, in which using the reference line as the central portion of the solid line as the reference, the image lines are substantially equidistantly branched into a plurality of image lines in the direction perpendicular to the reference line, the plurality of branched image lines are formed from broken lines divided in the direction substantially perpendicular to the reference line and laid out at a predetermined interval, and at least one of the plurality of branched image lines is laid out at a period different from that of the remaining branched image lines.

40. The method according to claim 36, wherein the sum of image line areas of the image lines having the length of the portion corresponding to one period formed from the image line portion and the non-image line portion of the broken line divided in the direction perpendicular to the reference line in the broken lines of the portion having the latent image falls within a range of 95% to 110% of an image line area substantially equal to the image line area of the solid line of the portion corresponding to the same length as one period in the broken lines divided in the direction substantially perpendicular to the reference line in the solid line of the portion having no latent image.

41. The method according to claim 36, wherein at a portion where the image lines of the portion having no latent image, the broken lines, the periodic broken lines, the periodic broken lines juxtaposed at the shifted period, the periodic broken lines juxtaposed at the different periods, or any two kinds of the image lines cross, one of the crossing image lines is deleted.

42. The method according to claim 36, wherein the image line pattern is at least one of a ground tint pattern, lathe work pattern, and relief pattern.

* * * * *

UNITED STATES PATENT AND TRADEMARK OFFICE

CERTIFICATE OF CORRECTION

PATENT NO. : 7,243,952 B2
APPLICATION NO. : 10/297679
DATED : July 17, 2007
INVENTOR(S) : Kazuhiko Shimada et al.

It is certified that error appears in the above-identified patent and that said Letters Patent is hereby corrected as shown below:

Title Page, Foreign Priority Data: should read

--March 6, 2001, JP 2001-62385--
--March 6, 2001, JP 2001-62386--
--March 6, 2001, JP 2001-62387--

Signed and Sealed this

Eleventh Day of December, 2007

JON W. DUDAS
*Director of the United States Patent and Trademark Office*